United States Patent
Choi et al.

(10) Patent No.: US 11,218,908 B2
(45) Date of Patent: Jan. 4, 2022

(54) DEVICE AND METHOD FOR LOAD DISTRIBUTION OF BASE STATION IN WIRELESS COMMUNICATION SYSTEM

(71) Applicant: Samsung Electronics Co., Ltd., Suwon-si (KR)

(72) Inventors: Jungmin Choi, Osan-si (KR); Hanseok Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 16/629,159

(22) PCT Filed: Jun. 4, 2018

(86) PCT No.: PCT/KR2018/006356
§ 371 (c)(1),
(2) Date: Jan. 7, 2020

(87) PCT Pub. No.: WO2019/009523
PCT Pub. Date: Jan. 10, 2019

(65) Prior Publication Data
US 2020/0137630 A1    Apr. 30, 2020

(30) Foreign Application Priority Data

Jul. 7, 2017 (KR) .......................... 10-2017-0086530

(51) Int. Cl.
*H04W 28/08* (2009.01)
*H04W 76/27* (2018.01)
(Continued)

(52) U.S. Cl.
CPC ......... *H04W 28/085* (2013.01); *H04W 16/10* (2013.01); *H04W 24/10* (2013.01);
(Continued)

(58) Field of Classification Search
CPC .......... H04W 28/08–09; H04W 28/00; H04W 28/02; H04W 28/0284; H04W 28/10–26;
(Continued)

(56) References Cited

U.S. PATENT DOCUMENTS 7,596,378 B1 * 9/2009 Nizri ..................... H04W 60/04
455/448
9,021,109 B1 * 4/2015 Gigliotti ................. H04L 67/14
709/228
(Continued)

FOREIGN PATENT DOCUMENTS

WO    2013/073876 A1    5/2013

OTHER PUBLICATIONS

Intel Corporation, Potential solution and analysis for multicarrier load distribution, 3GPP TSG RAN WG2 R2-151185, Apr. 20-24, 2015, Bratislava, Slovakia.
(Continued)

*Primary Examiner* — Warner Wong
(74) *Attorney, Agent, or Firm* — Jefferson IP Law, LLP

(57) ABSTRACT

The present disclosure relates to a 5th generation (5G) or pre-5G communication system for supporting a higher data transfer rate beyond a 4th generation (4G) communication system, such as long term evolution (LTE). An operation method of a reception device in a wireless communication system comprises the steps of: receiving a signal transmitted through a plurality of antennas of a transmission device; determining an initial symbol vector on the basis of the signal; determining a first candidate symbol vector, on the basis of a plurality of solution vectors obtained by searching for the initial symbol vector; determining a second candidate symbol vector by changing at least one symbol value of the first candidate symbol vector; and determining a symbol
(Continued)

vector transmitted from the transmission device, on the basis of at least a part of the second candidate symbol vector.

15 Claims, 13 Drawing Sheets

(51) Int. Cl.
| | |
|---|---|
| *H04W 16/10* | (2009.01) |
| *H04W 24/10* | (2009.01) |
| *H04W 28/02* | (2009.01) |
| *H04W 28/12* | (2009.01) |
| *H04W 28/20* | (2009.01) |
| *H04W 72/10* | (2009.01) |
| *H04W 88/08* | (2009.01) |

(52) U.S. Cl.
CPC ... *H04W 28/0284* (2013.01); *H04W 28/0289* (2013.01); *H04W 28/12* (2013.01); *H04W 28/20* (2013.01); *H04W 72/10* (2013.01); *H04W 76/27* (2018.02); *H04W 88/08* (2013.01)

(58) Field of Classification Search
CPC .......... H04W 76/19–28; H04W 16/00; H04W 16/02; H04W 16/10; H04W 24/00–10; H04W 72/04–10; H04W 88/00; H04W 88/08; H04W 88/085
See application file for complete search history.

(56) References Cited

U.S. PATENT DOCUMENTS

| | | | | |
|---|---|---|---|---|
| 9,282,529 | B1* | 3/2016 | Jintaseranee | H04W 64/00 |
| 9,479,986 | B2* | 10/2016 | Chang | H04W 36/22 |
| 2004/0058679 | A1* | 3/2004 | Dillinger | H04W 36/0085 |
| | | | | 455/439 |
| 2004/0192313 | A1* | 9/2004 | Otting | H04W 48/20 |
| | | | | 455/446 |
| 2006/0128394 | A1* | 6/2006 | Turina | H04W 36/22 |
| | | | | 455/453 |
| 2009/0137251 | A1* | 5/2009 | Ji | H04W 36/22 |
| | | | | 455/437 |
| 2010/0144363 | A1* | 6/2010 | De Rosa | H04W 72/0486 |
| | | | | 455/452.1 |
| 2010/0304747 | A1* | 12/2010 | Kazmi | H04W 36/08 |
| | | | | 455/436 |
| 2011/0053598 | A1 | 3/2011 | Ahluwalia | |
| 2011/0250882 | A1 | 10/2011 | Gao et al. | |
| 2011/0250891 | A1* | 10/2011 | Zou | H04W 36/04 |
| | | | | 455/437 |
| 2011/0256870 | A1* | 10/2011 | Park | H04W 36/0085 |
| | | | | 455/436 |
| 2012/0009966 | A1* | 1/2012 | Khanka | H04W 72/06 |
| | | | | 455/509 |
| 2012/0106349 | A1* | 5/2012 | Adjakple | H04W 36/22 |
| | | | | 370/241 |
| 2012/0225682 | A1* | 9/2012 | Kojima | H04W 36/0055 |
| | | | | 455/507 |
| 2013/0336110 | A1* | 12/2013 | Sridhar | H04L 5/0071 |
| | | | | 370/230 |
| 2014/0003239 | A1 | 1/2014 | Etemad et al. | |
| 2014/0004862 | A1* | 1/2014 | Ekemark | H04W 36/22 |
| | | | | 455/443 |
| 2014/0024382 | A1* | 1/2014 | Zou | H04W 28/08 |
| | | | | 455/445 |
| 2014/0066077 | A1* | 3/2014 | Brisebois | H04W 48/20 |
| | | | | 455/445 |
| 2014/0247810 | A1 | 9/2014 | Bontu et al. | |
| 2015/0017987 | A1 | 1/2015 | Won et al. | |
| 2015/0131441 | A1* | 5/2015 | Huang | H04W 28/08 |
| | | | | 370/235 |
| 2016/0044539 | A1* | 2/2016 | Yiu | H04W 88/02 |
| | | | | 370/235 |
| 2016/0192370 | A1* | 6/2016 | Chan | H04W 76/14 |
| | | | | 370/329 |
| 2016/0249228 | A1* | 8/2016 | Zhao | H04L 12/56 |
| 2016/0249265 | A1 | 8/2016 | Won et al. | |
| 2017/0012792 | A1 | 1/2017 | Chang et al. | |
| 2017/0265115 | A1* | 9/2017 | Sivavakeesar | H04W 16/08 |
| 2018/0249367 | A1* | 8/2018 | Rosa | H04W 28/0284 |
| 2018/0359683 | A1* | 12/2018 | Rosa | H04W 48/12 |
| 2019/0319895 | A1* | 10/2019 | Zeng | H04L 47/72 |

OTHER PUBLICATIONS

Alcatel—Lucent et al., A harmonised CRS solution for Idle mode load distribution, 3GPP TSG RAN2#91 R2-154729, Oct. 5-9, 2015, Malmö, Sweden.

Ericsson et al., Cell-specific prioritization for idle mode load balancing, 3GPP TSG RAN WG2 R2-142530, May 19-23, 2014, Seoul, South Korea.

Alcatel—Lucent et al., Idle UE Distribution in Macro Only System and HetNets, 3GPP TSG-RAN WG2 R2-142495 May 19-23, 2014, Seoul, South Korea.

Zte, Hash algorithm based idle UE distribution, 3GPP TSG RAN WG2 R2-142000, May 19-23, 2014, Seoul, Korea.

Alcatel—Lucent et al., Idle UE Distribution in Macro Only System and HetNets, 33GPP Draft, R2-143638_Idletrafficredistribution_ DISC-V5, 3rd Generation Partnership Project (3GPP), Mobile Compeience Centre; 650, Route Des Lucioles, F-06921, Sophia-Antipolis Cedex, France, vol. RAN WG2, Dresden, Germany, Aug. 18, 2014-Aug. 22, 2014, Aug. 17, 2014, XP050794608.

Extended European Search Report dated May 14, 2020, issued in European Patent Application No. 18828677.7.

* cited by examiner

DEVICE AND METHOD FOR LOAD DISTRIBUTION OF BASE STATION IN WIRELESS COMMUNICATION SYSTEM

TECHNICAL FIELD

The present disclosure generally relates to a method for base station load distribution in a wireless communication system, and more particularly, to an apparatus and a method for redistributing an idle terminal of an over-loaded base station based on base station load, and prompting terminal camping to a low-loaded base station in the wireless communication system.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mm Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A radio access system is to provide a user with a communication service over a radio channel. The radio access system includes a plurality of base stations which perform wireless communication with a user terminal. The base stations of the radio access system provide radio access to terminals located in a geographical area of a specific range, and such a geographical area is referred to as a cell.

The base station provides the radio access to the terminal located in its cell. That is, the base station communicates with a core network over a backhaul network, and transmits and receives data to and from the terminals located within its cell. Radio resources and a backhaul network capacity provided by one base station are limited. Thus, if a great number of terminals access the base station at a specific time, traffic exceeding the backhaul network capacity in amount as well as the radio channel of the base station may occur, and a service quality experienced by the terminals in the base station cell may be deteriorated.

DISCLOSURE OF INVENTION

Technical Problem

Based on the discussions described above, the present disclosure provides an apparatus and a method for base station load distribution in a wireless communication system.

In addition, the present disclosure provides an apparatus and a method for redistributing an idle terminal of an over-loaded base station in a wireless communication system.

In addition, the present disclosure provides an apparatus and a method for prompting terminal camping to a low-loaded base station in a wireless communication system.

In addition, the present disclosure provides an apparatus and a method for determining an idle terminal percentage needing redistribution at an over-loaded base station in a wireless communication system.

In addition, the present disclosure provides an apparatus and a method for determining whether to perform a redistribution operation and a target neighboring cell at a terminal in a wireless communication system.

In addition, the present disclosure provides an apparatus and a method for determining a target neighboring cell based on resource capacity status information and access factor information received from neighboring cells at a terminal in a wireless communication system.

In addition, the present disclosure provides an apparatus and a method for setting a frequency or a cell of a low load with the highest priority at a base station if connection of a terminal is released in a wireless communication system.

Solution to Problem

According to various embodiments of the present disclosure, an operating method of a base station in a wireless communication system includes periodically broadcasting resource capacity status information of a cell and access factor information at the base station, if determining a cell of the base station is determined to be over-loaded, determining an idle mode terminal percentage to move to other frequency through a redistribution operation based on at least one of a first threshold for the number of terminals connected to the base station and a connection attempt rate per time of a terminal, and broadcasting the idle mode terminal percentage.

According to various embodiments of the present disclosure, an operating method of a terminal in a wireless communication system includes receiving an idle mode terminal percentage to move to other frequency through a redistribution operation from a base station, determining whether to perform the redistribution operation of the terminal, based on the received idle mode terminal percentage to move to other frequency through a redistribution operation, if determining to perform the redistribution operation of the terminal, receiving at least one of resource capacity status information and access factor information from neighboring cells of other frequency, and determining a cell to camp on based on at least one of the resource capacity status information and the access factor information.

According to various embodiments of the present disclosure, an operating method of a base station in a wireless communication system includes receiving a low-loaded cell information from a neighboring base station, receiving signal strength measurement results of neighboring cells from a terminal, if connection of the terminal is released, setting the low-loaded cell with the highest priority, based on the received low-loaded cell information and the received measurement results, and transmitting information of the setting to the terminal.

According to various embodiments of the present disclosure, an apparatus of a base station in a wireless communication system includes at least one processor for determining whether a cell of the base station is over-loaded, if determining the over-loaded cell of the base station, determining an idle mode terminal percentage to move to other frequency through a redistribution operation based on at least one of a first threshold for the number of terminals connected to the base station and a connection attempt rate per time of a terminal, and periodically determining a resource capacity status of the cell, and a transceiver for periodically broadcasting resource capacity status information of the cell and access factor information, and broadcasting the determined idle mode terminal percentage.

According to various embodiments of the present disclosure, an apparatus of a terminal in a wireless communication system includes a transceiver for receiving an idle mode terminal percentage to move to other frequency through a redistribution operation from a base station, and at least one processor for determining whether to perform the redistribution operation of the terminal, based on the received idle mode terminal percentage to move to other frequency through a redistribution operation, wherein, if determining to perform the redistribution operation of the terminal, the transceiver receives at least one of resource capacity status information and access factor information from neighboring cells of other frequency, and determines a cell to camp on based on at least one of the resource capacity status information and the access factor information.

According to various embodiments of the present disclosure, an apparatus of a base station in a wireless communication system includes a transceiver for receiving a low-loaded cell information from a neighboring base station, and receiving signal strength measurement results of neighboring cells from a terminal, and at least one processor for, if connection of the terminal is released, setting the low-loaded cell with the highest priority, based on the received low-loaded cell information and the received measurement results, wherein the transceiver transmits information of the setting to the terminal.

Advantageous Effects of Invention

An apparatus and a method according to various embodiments of the present disclosure may, if a cell is over-loaded in a base station, address the over-load of the cell by redistributing an idle terminal and more efficiently control the cell load. In addition, with respect to a terminal to be released due to no traffic for a specific time, the cell load may be distributed and the over-load may be prevented in advance, by prompting the camping on a low-loaded frequency or cell if the connection is released. Further, using a method suggested in the present disclosure, real-time load information may be updated rapidly, and efficient load distribution is achieved without having to broadcasting the load information for unnecessary neighboring cells.

Effects obtainable from the present disclosure are not limited to the above mentioned effects, and other effects which are not mentioned may be clearly understood by those skilled in the technical field to which the present disclosure belongs through the following descriptions.

BEST MODE FOR CARRYING OUT THE INVENTION

The terms used in the present disclosure are only used to describe specific embodiments, and are not intended to limit other embodiments. Singular expressions may include plural expressions as well unless the context clearly indicates otherwise. All terms used herein including technical and scientific terms may have the same meaning as those commonly understood by a person skilled in the art to which the present disclosure pertains. Terms such as those defined in a generally used dictionary among the terms used in the present disclosure may be interpreted to have the meanings equal or similar to the contextual meanings in the relevant field of art, and are not to be interpreted to have ideal or excessively formal meanings unless clearly defined in the present disclosure. In some cases, even a term defined in the present disclosure should not be interpreted to exclude embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Hereafter, the present disclosure relates to an apparatus and a method for base station load distribution in a wireless communication system. Specifically, the present disclosure describes a technique for prompting a redistribution operation of an idle terminal at an over-loaded bases station in the wireless communication system, and in particular, for prompting the camping of idle terminals to a low-loaded base station at the base station.

Terms indicating network entities, terms indicating control information, terms indicating components of an apparatus, terms (e.g., X2) indicating communication protocols, and terms indicating communication technologies, which are used in the following descriptions, are for the sake of explanations. Accordingly, the present disclosure is not limited to the terms to be described, and may use other terms having technically identical meaning.

In addition, the present disclosure describes various embodiments using terms used in some communication standards (e.g., $3^{rd}$ generation partnership (3GPP)), which is merely an example for explanations. Various embodiments of the present disclosure may be easily modified and applied in other communication systems.

Figure 1:
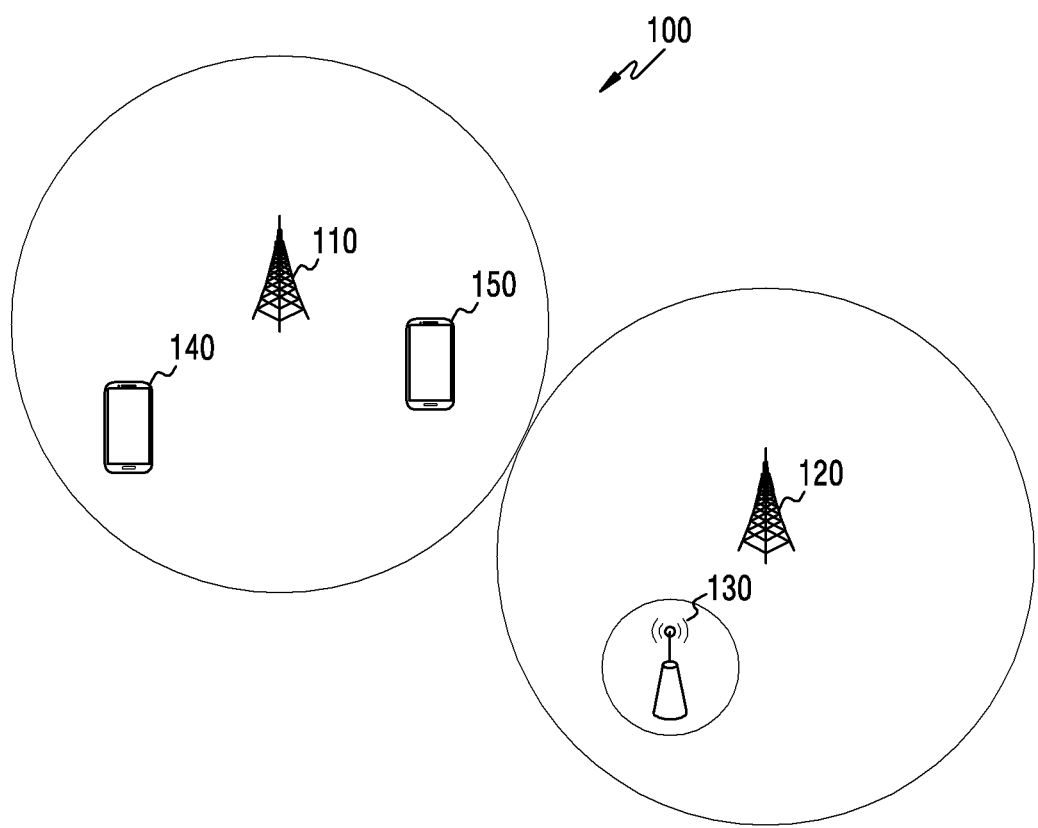
FIG. 1 illustrates a wireless communication system according to various embodiments of the present disclosure.

FIG. 1 illustrates a wireless communication system according to various embodiments of the present disclosure. Referring to FIG. 1, the system includes a base station 110, a base station 120, a base station 130, a terminal 140, and a terminal 150, as some of nodes which use a radio channel. While FIG. 1 illustrates only the base stations 110, 120 and 130, a plurality of base stations identical or similar to the base stations 110 through 30 may be included.

The base station 110 provides radio access to the terminals 140 and 150. The base station 110 is one of entities which construct an access network, and has coverage including a particular geographical area. The base station 110 may be referred to as, besides the base station, an access point (AP), an eNodeB (eNB), a 5th generation node (5G node), a wireless point, a transmission/reception point (TRP), or other term having a technically equivalent meaning.

According to an embodiments, the base station 110 and the base station 120 may be macro cell base stations with broader coverage, and the base station 130 may be a small cell base station used to cover a smaller area than the macro cell base station. That is, the base station 130 may be a pico or femto base station which covers a smaller area than the macro base station.

According to an embodiments, the base station 110, the base station 120 and the base station 130 may be devices which communicate with user terminals using different frequency resources. In other words, the base station 110 and the base station 120, as adjacent cells, may transmit and receive data to and from terminals in each coverage over a radio channel of different frequency areas. The base station 120 and the base station 130 have relationship of the macro cell base station and the small cell base station with the coverage partially overlapping, and may transmit and receive the data to and from the terminal through the different frequency resources.

The terminal 140 and the terminal 150 are user devices used by a user, and perform communicate with the base station 110 over the radio channel. The terminal 140 and the terminal 150 are located in the coverage of the base station 110 and may transmit and receive data packets from the base station 110. For example, the terminal 140 and the terminal 150, as the user terminals which move, may camp from the base station 110 to the base station 120 or the base station 130 for load distribution. In this case, the terminal 140 and the terminal 150 may receive a data packet from the camping base station among the base station 120 or the base station 130.

In various embodiments, the terminal 140 and the terminal 150 may be a portable electronic device, and may be one of a smart phone, a portable terminal, a mobile phone, a mobile pad, a media player, a tablet computer, a handheld computer, or a personal digital assistant (PDA). In other embodiments, the terminal 140 and the terminal 150 may be stationary devices. Also, the terminal 140 and the terminal 150 may be devices which combine two or more functions of the above-stated devices.

Figure 2:
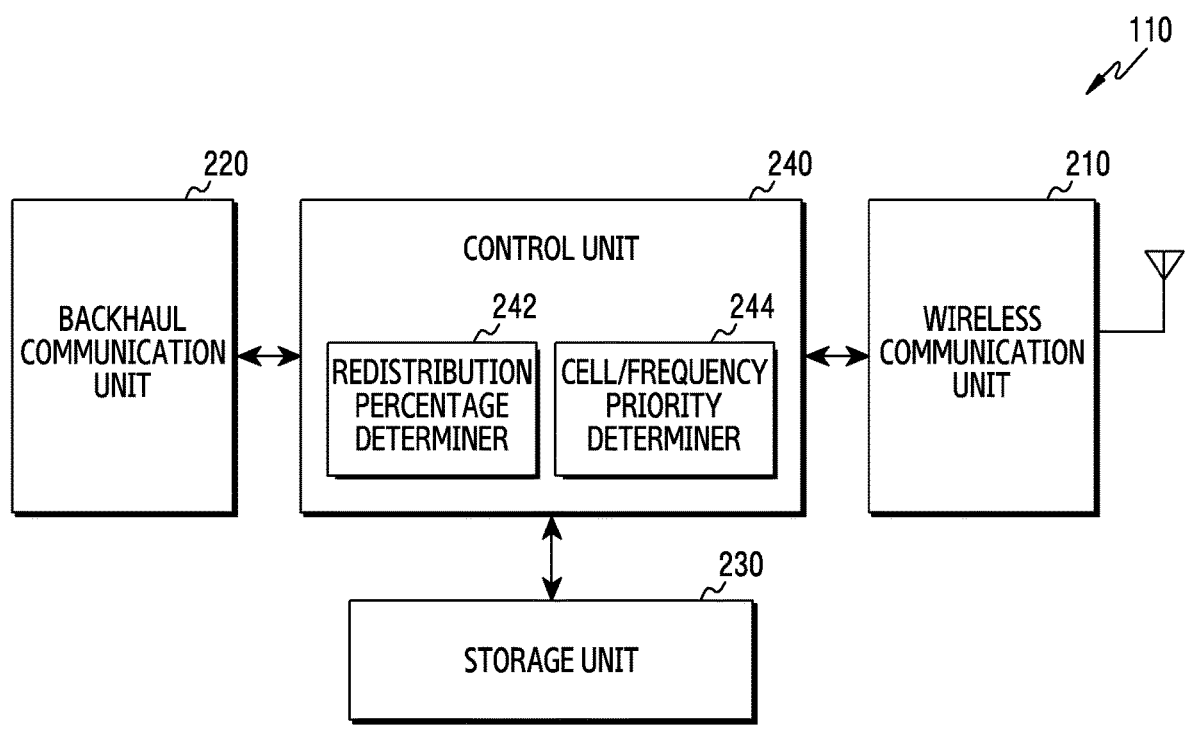
FIG. 2 illustrates a block diagram of a base station in a wireless communication system according to various embodiments of the present disclosure.

FIG. 2 illustrates a block diagram of a base station in a wireless communication system according to various embodiments of the present disclosure. The configuration of FIG. 2 may be understood as the configuration of the base station 110. A term such as 'portion' or '~er' indicates a unit for processing at least one function or operation, and may be implemented using hardware, software, or a combination of hardware and software. As shown FIG. 2, the base station 110 includes a wireless communication unit 210, a backhaul communication unit 220, a storage unit 230, and a control unit 240.

The wireless communication unit 210 may perform functions for transmitting and receiving signals over a radio channel. For example, the wireless communication unit 210 performs a conversion function between a baseband signal and a bit string according to a physical layer standard of a system. For example, in data transmission, the wireless communication unit 210 generates complex symbols by encoding and modulating a transmit bit string. Also, in data reception, the wireless communication unit 210 restores a receive bit string by demodulating and decoding a baseband signal. Also, the wireless communication unit 210 up-converts the baseband signal to a radio frequency (RF) band signal, transmits it via an antenna, and down-converts an RF band signal received via an antenna to a baseband signal.

For doing so, the wireless communication unit 210 may include a transmit filter, a receive filter, an amplifier, a mixer, an oscillator, a digital to analog convertor (DAC), an analog to digital convertor (ADC), and so on. In addition, the wireless communication unit 210 may include a plurality of transmit and receive paths. Further, the wireless communication unit 210 may include at least one antenna array including a plurality of antenna elements. In terms of the hardware, the wireless communication unit 210 may include a digital circuit and an analog circuit, and the analog unit may include a plurality of sub-units according to an operating power and an operating frequency.

The wireless communication unit 210 transmits and receives the signals as stated above. Hence, the wireless communication unit 210 may be referred to as a transmitter, a receiver, or a transceiver. Also, in the following description, the transmission and the reception performed over the radio channel are used as the meaning which embraces the above-stated processing of the wireless communication unit 210.

The backhaul communication unit 220 provides an interface for communicating with other nodes in the network. That is, the backhaul communication unit 220 converts a bit sting transmitted from the base station 110 to another node, for example, to another access node, another base station, an upper node, or a core network, to a physical signal, and converts a physical signal received from the other node to a bit string. For example, the backhaul communication unit 220 may convert the bit string transmitted from the base station 110 to the base station 120, to the physical signal, and convert the physical signal received from the base station 120 to the bit string.

The storage unit 230 stores a basic program for operating the base station 110, an application program, and data such as setting information. The storage unit 230 may include a volatile memory, a non-volatile memory, or a combination of a volatile memory and a non-volatile memory. The storage unit 230 provides the stored data at a request of the control unit 240.

The control unit 240 controls general operations of the base station. For example, the control unit 240 transmits and receives signals through the wireless communication unit 210 or the backhaul communication unit 220. Also, the control unit 240 records and reads data in and from the storage unit 230. For doing so, the control unit 240 may include at least one processor. For example, the control unit 240 may control the base station 110 to carry out operations to be explained according to various embodiments.

According to various embodiments, the control unit 240 determines a redistribution percentage of idle terminals of a corresponding cell if a cell in coverage is over-loaded at the base station 110 according to various embodiments to be described later. For doing so, the control unit 240 may include a redistribution percentage determiner 242. For example, the redistribution percentage determiner 242 may determine whether to perform the redistribution because the cell is over-loaded, and at this time, determine the redistribution terminal percentage for the redistribution of terminals of a specific percentage. In addition, according to various embodiments, the control unit 240 may determine a neighboring cell or frequency of low load with a high priority station if terminal connection is released, and thus prompt the camping to a corresponding cell or frequency. To this end, the control unit 240 may include a cell/frequency priority determiner 244. For example, based on information measured from the terminal, if the connection of the terminal capable of camping on the low-loaded cell/frequency is released, the cell/frequency priority determiner 244 may determine the corresponding cell/frequency with a high priority to camp on the corresponding cell/frequency. Herein, the redistribution percentage determiner 242 and the cell/frequency priority determiner 244 may be, as an instruction set or code stored in the storage unit 230, the instructions/code resided in the control unit 240 at least temporarily or a storage space storing the instructions/code, or part of circuitry of the control unit 240. The control unit 240 may include the redistribution percentage determiner 242 and the cell/frequency priority determiner 244 as one block, and may be configured to include the functions of only one of the two blocks. For example, the control unit 240 controls the first base station 110 to perform a procedure according to various embodiments to be described.

Figure 3:
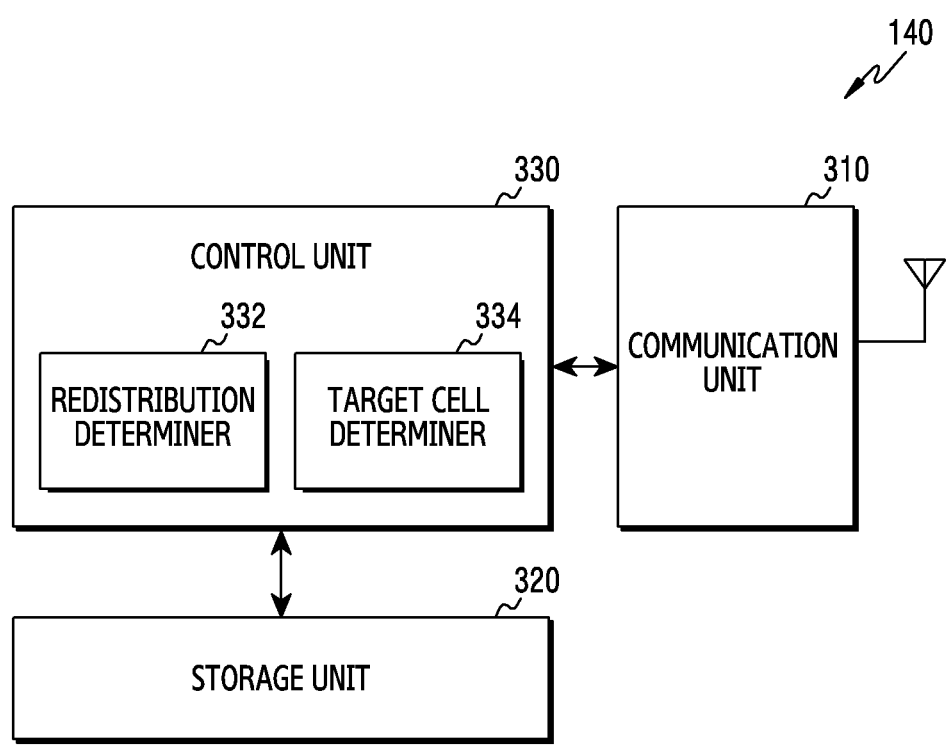
FIG. 3 illustrates a block diagram of a terminal in a wireless communication system according to various embodiments of the present disclosure.

FIG. 3 illustrates a block diagram of a terminal in a wireless communication system according to various embodiments of the present disclosure. The configuration of FIG. 3 may be understood as the configuration of the terminal 140. A term such as 'portion' or '~er' indicates a unit for processing at least one function or operation, and may be implemented using hardware, software, or a combination of hardware and software.

Referring to FIG. 3, the terminal 140 includes a communication unit 310, a storage unit 320, and a control unit 330.

The communication unit 310 may perform functions for transmitting and receiving signals over a radio channel. For example, the communication unit 310 performs a conversion function between a baseband signal and a bit string according to a physical layer standard of a system. For example, in data transmission, the communication unit 310 generates complex symbols by encoding and modulating a transmit bit string. Also, in data reception, the communication unit 310 restores a receive bit string by demodulating and decoding a baseband signal. Also, the communication unit 310 up-converts the baseband signal to an RF band signal, transmits it via an antenna, and down-converts an RF band signal received via an antenna to a baseband signal. For example, the communication unit 310 may include a transmit filter, a receive filter, an amplifier, a mixer, an oscillator, a DAC, an ADC, and so on.

In addition, the communication unit 310 may include a plurality of transmit and receive paths. Further, the communication unit 310 may include at least one antenna array including a plurality of antenna elements. In terms of the hardware, the communication unit 310 may include a digital circuit and an analog circuit (e.g., a radio frequency integrated circuit (RFIC)). Herein, the digital circuit and the analog circuit may be implemented as a single package. Also, the communication unit 310 may include a plurality of RF chains. Further, the communication unit 310 may perform beamforming.

The communication unit 310 transmits and receives the signals as stated above. Hence, the communication unit 310 may be referred to as a transmitter, a receiver, or a transceiver. Also, in the following description, the transmission and the reception over the radio channel is used as the meaning which embraces the above-stated processing of the communication unit 310.

The storage unit 320 stores a basic program for operating the terminal 140, an application program, and data such as setting information. The storage unit 320 may include a volatile memory, a non-volatile memory, or a combination of a volatile memory and a non-volatile memory. The storage unit 320 provides the stored data in response to a request of the control unit 330.

The control unit 330 controls general operations of the terminal 140. For example, the control unit 330 transmits and receives signals through the communication unit 310. Also, the control unit 330 records and reads data in and from the storage unit 320. For doing so, the control unit 330 may include at least one processor or microprocessor, or may be part of a processor. Also, part of the communication unit 310 and the control unit 330 may be referred to as a communication processor (CP).

According to various embodiments, the control unit 330 determines whether to perform the redistribution operation based on the redistribution percentage received from the base station at the terminal 140 according to various embodiments to be described. For doing so, the control unit 330 may include a redistribution determiner 332. In addition, according to various embodiments, the control unit 330 determines a target cell for the terminal 140 to camp on based on information broadcast from neighboring cells. For doing so, the control unit 330 may include a target cell determiner 334. Herein, the redistribution determiner 332 and the target cell determiner 334 may be, as an instruction set or code stored in the storage unit 320, the instructions/code resided in the control unit 330 at least temporarily or a storage space storing the instructions/code, or part of circuitry of the control unit 330. The control unit 330 may include the redistribution determiner 332 and the target cell determiner 334 as a single block. For example, the control unit 330 controls the terminal 140 to perform a procedure according to various embodiments to be described.

According to various embodiments of the present disclosure, the base station 110 may transmit and receive data to and from a plurality of terminals besides the terminal 140 and terminal 150 over the radio channel. According to an embodiment, if a plurality of terminals exceeding capacity of the base station 110 is present in the cell coverage of the base station 110 and the base station 110 is over-loaded, the base station 110 may request some of the terminals of the cell coverage to perform the redistribution operation to other base station (e.g., the base stations 120 through 130). At this time, it may be more effective to distribute idle terminals not connected the base station 110, rather than handing over the terminals already operating by connecting to the base station 110. This is because the service may be interrupted if the terminal already connected and serviced is handed over.

In addition, a general idle terminal distribution method relates to a technique for distributing each terminal between frequencies through dedicated signaling, but a scheme for redistributing the idle terminals currently camping on the cell has not been proposed. In particular, since the cell load varies over time, it may be required to redistribute the idle terminal, but the general scheme considers only the distribution percentage of the frequency but does not consider the load of each cell.

The idle terminal distribution in a multicarrier network needs to consider two purposes. The first is a variance of the idle terminals camping on the over-loaded cell, and the second is the camping prompt of terminals to a cell of a low use rate in a heterogeneous network (HetNet) environment. A standard message for the redistribution of the idle terminals has been included in the 3GPP standard, but it is difficult to efficiently perform the redistribution operation merely with the message defined in the standard. In the HetNet environment, there is mostly no X2 link between the macro base station and an indoor small cell in an actual commercial network. This is because it is hard for the macro base station to maintain a great number of indoor small cells and the X2 link due to the X2 load problem. In addition, if only the macro base station exists, load information exchange is allowed through an X2 resource status reporting procedure, but it is hard to shorten a load information exchange period not to aggravate the X2 link load due to the load information exchange, and if the load information exchange period is set long (e.g., set to over 10 seconds), load information accuracy of the neighboring cell is lowered in the redistribution operation. Thus, while techniques discussed in the 3GPP enable the effective load redistribution by knowing all the load information of the neighboring cells, a solution for acquiring the load information via other link than the X2 link of neighboring base stations is required because the load information is mostly not exchanged due to the absence of the X2 link between the macro cell base station and the femto base station in the actual HetNet environment.

Hereinafter, referring to FIG. 4 through FIG. 13, the present disclosure describes a distribution method of an idle terminal of an over-loaded cell and a camping prompt method of a terminal to a low-loaded cell.

Figure 4:
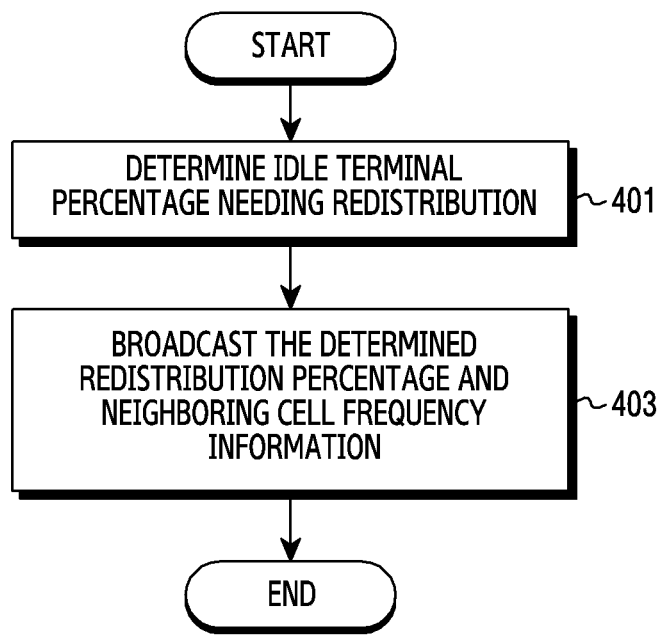
FIG. 4 illustrates an operating method of a base station for distributing an idle terminal in a wireless communication system according to various embodiments of the present disclosure.

FIG. 4 illustrates an operating method of a base station for distributing an idle terminal in a wireless communication system according to various embodiments of the present disclosure. FIG. 4 illustrates an operating method of the base station 110.

Referring to FIG. 4, in step 401, the base station determines an idle terminal percentage requiring the redistribution. That is, if the cell is over-loaded, the base station calculates the percentage of the idle terminals needing the redistribution to a neighboring cell among idle terminals in cell coverage. For example, if determining the cell overloaded state in which traffic exceeding a capacity of a radio channel or a backhaul network occurs, the base station determines the percentage of the terminals needing the redistribution by considering at least one of a threshold of the number of terminals connectable to the cell and a terminal access rate per time.

Next, in step 403, the base station broadcasts the determined redistribution percentage and frequency information of neighboring cells. For example, the base station broadcasts the terminal percentage needing the redistribution among the terminals currently connected, which is determined in step 401, and the frequency information of the neighboring cells. In so doing, the terminals located in the cell coverage of the base stations may receive the redistribution terminal percentage and the frequency information of the neighboring cells which are broadcast from the base station.

Figure 5:
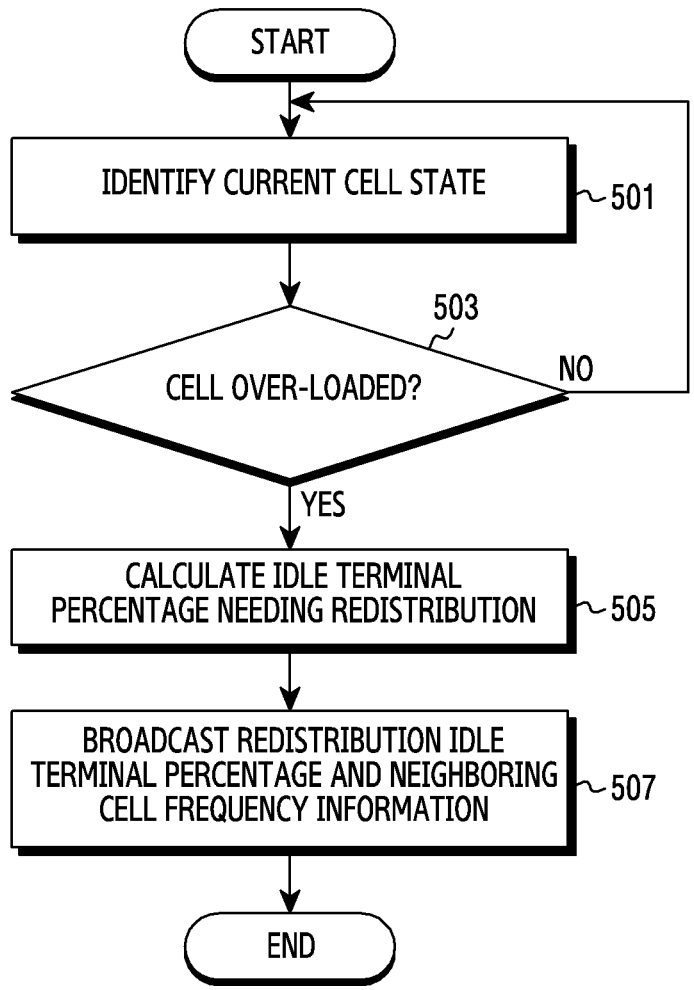
FIG. 5 illustrates a specific operating method of a base station for distributing an idle terminal in a wireless communication system according to various embodiments of the present disclosure.

FIG. 5 illustrates a specific operating method of a base station for distributing an idle terminal in a wireless communication system according to various embodiments of the present disclosure. FIG. 5 illustrates an operating method of the base station 110.

Referring to FIG. 5, in step 501, the base station identifies a state of a current cell. That is, the base station determines the current cell state, to determine whether the cell in coverage is over-loaded. For example, the base station may determine the cell state by at least one of a radio resource control (RRC) establishment attempt count, the number of RRC connected terminals based on a primary cell (PCell), the number of active terminals, and a resource use rate with respect to the cell in the coverage. According to an embodiment, the base station may calculate a current cell load metric. The cell load metric may be determined using at least one of a radio resource amount in use, a target data rate per service, an average radio resource usage per bit and the number of effective data transmit bearers per time. For example, the cell load may be calculated based on <Equation 1>.

$$\text{Cell Load} = \max\{\text{DL load}, \text{UL load}\} \quad \text{Equation 1}$$

In <Equation 1>, Cell Load denotes the numeralized cell load. DL load denotes a downlink physical resource block (PRB) load number of the cell, and UL load denotes an uplink PRB load number of the cell. Cell Load may be determined to a greater value of the downlink load and the uplink load number of the cell. At this time, DL load and UL load may be calculated based on <Equation 2>.

$$\text{Load} = 100 \times \min\{1, \text{Load}_{control} + \text{Load}_{GBR} + \text{Load}_{NGBR} + \text{Load}_{padding}\} \quad \text{Equation 2}$$

In <Equation 2>, Load denotes a downlink load or uplink load number of the cell. $\text{Load}_{control}$ denotes a PRB usage used for a control channel of the cell, and $\text{Load}_{GBR}$ denotes a PRB usage used by guaranteed bit rate (GBR) bearers. $\text{Load}_{padding}$ denotes a load by the PRB usage used for a padding bit. $\text{Load}_{NGBR}$ denotes a sum of loads per non-guaranteed bit rate (non-GBR) QoS class identifier (QCI). In particular, $\text{Load}_{NGBR}$ may be calculated based on <Equation 3>.

$$\text{Load}_{NGBR} = \Sigma_q \text{Load}_{NGBR,q} \quad \text{Equation 3}$$

In <Equation 3>, $Load_{NGBR}$ denotes the sum of the loads per non-GBR QCI, and $Load_{NGBR,q}$ denotes a load per non-GBR QCI. At this time, $Load_{NGBR,q}$ indicates a minimum value of "an expected PRB usage required for corresponding QCI bearers" and "a product of the PRB usage used by the corresponding QCI bearers and a weight", and may be calculated based on <Equation 4>.

$$Load_{NGBR,q} = \frac{\min\left\{\begin{array}{c}CBR_q \times W \times (\text{average } PRBs \text{ per bit}) \times \\ N_q \cdot w_q \times (PRBs \text{ for } QCI \text{ } q)\end{array}\right\}}{(\text{Total number of } PRBs)} \quad \text{Equation 4}$$

In <Equation 4>, configured bit rate $CBR_q$ is a bit rate required for a QCI q bearer, and may be set by a network operator. W denotes a monitoring cycle, and average PRBs per bit denotes an average PRB amount required for 1-bit transmission. $N_q$ denotes the number of active QCI q bears through which traffic actually flows, and $w_q$ denotes a weight factor value. PRBs for QCI q denotes a PRB amount for the QCI q bearer. Total number of PRBs denotes the total number of PRBs available during the time W.

According to an embodiment, the redistribution percentage determiner 242 may identify the current cell state of the base station to determine whether to redistribute, or calculate the cell load metric, on the assumption for determining the redistribution percentage.

In step 503, the base station determines whether the current cell is over-loaded. That is, based on the current cell state identified in step 501, the base station determines whether the cell in the coverage is over-loaded. Whether the cell is over-loaded may change according to settings of the network operator. For example, the base station may determine that the cell is over-loaded in at least one of a case (Condition A) in which an RRC establishment attempt rate Y exceeds a threshold attempt value with respect to the cell of the coverage, a case (Condition B) in which the number X of RRC connected terminals based on PCell exceeds a threshold connection value, or a case (Condition C) in which the cell load metric exceeds a threshold load value, as shown in <Table 1>. According to another embodiment, the base station may determine that the cell is over-loaded if the cell load metric exceeds the threshold load value and the number of the RRC connected terminals exceeds the threshold connection value (Condition A and C). Herein, assuming that an access frequency is constant per terminal, the RRC connection attempt rate of a particular cell is expected to be proportional to the number of idle mode terminals which are camping. The RRC connection attempt rate may include the same meaning as the RRC connection attempts for a particular time, for example, per 1 second. The attempt threshold value (attemptTh), the threshold connection number (connectTh) and the threshold load (loadTh) may be values preset by the network operator. In this case, the thresholds of each factor used for the cell over-load determining condition may be set for each cell. According to an embodiment, the redistribution percentage determiner 242 may determine whether the current cell is over-loaded by comparing the identified current cell state and the threshold values, and thus determine whether to redistribute the terminals. The base station proceeds to step 505 if determining that the cell is over-loaded. By contrast, if determining that the cell is not over-loaded, the base station may return to step 501 which is the first step, and identify the state of the cell after a specific time.

TABLE 1

| Condition | Type | Cell State |
|---|---|---|
| A | RRC connection attempt rate (Y) | Y > attemptTh |
| B | the number X of RRC connected terminals based on PCell (X) | X > connectTh |
| C | cell load (Z) | Z > loadTh |

That is, if determining to redistribute the terminal due to the over-loaded state of the cell in step 503, the base station determines an idle terminal percentage needing the redistribution by considering at least one of a threshold of the number of terminals connectable to the cell and the access rate per time. For example, the base station may calculate the idle terminal percentage needing the redistribution by considering the RRC establishment attempt rate and the number of the RRC connected terminals based on the PCell. According to an embodiment, the redistribution percentage determiner 242 may determine the idle terminal percentage needing the redistribution, that is, a redistribution factor based on the following <Equation 5>.

$$redistFactor_{serving} = 100 \times \left(1 - \frac{connectTh}{avgConnectionTime \times Y}\right)(\%) \quad \text{Equation 5}$$

In <Equation 5>, $redistFactor_{serving}$ denotes the idle terminal percentage needing the redistribution in a serving cell. avgConnectionTime denotes an average connection time of the connected terminals, and may be updated by set intervals as a system parameter. Y denotes the number of the RRC establishment attempts per unit time, and the number of the RRC establishment attempts may be collected as the number of RRC connection request message receptions from the terminal. For example, Y may be updated as a system parameter by set intervals. The update interval may vary according to setting. Assuming that the connection frequency is constant for each terminal, the RRC establishment attempt rate of a particular cell may be expected to be proportional to the number of the idle mode terminals which are camping. connectTh denotes a threshold of the number of the RRC connected terminals based on the PCell.

In <Equation 5>, the product of avgConnectionTime and Y is a product of the average connection time and the RRC establishment attempt rate value per hour and denotes the number of the connected terminals expected. Thus, the value $$\frac{connectTh}{avgConnectionTime \times Y}$$

by dividing the number of the expected connection terminals in the over-loaded state by the threshold number of the connection terminals becomes a value smaller than 1, a value by subtracting the value $$\frac{connectTh}{avgConnectionTime \times Y}$$

from 1 denotes the connected terminal rate exceeding the threshold.

Next, in step 507, the base station broadcasts the redistribution idle terminal percentage. At this time, an indicator indicating whether the redistribution operation is performed and/or neighboring cell frequency information may be further broadcast. That is, if determining that the cell is over-loaded, the base station broadcasts the neighboring cell frequency information, together with the information indicating the redistribution of the terminal is performed and the idle terminal percentage needing the redistribution. For example, the base station broadcasts the redistribution idle terminal percentage acquired based on <Equation 5> in step 505 and the performance information of the redistribution operation to the terminals in the cell, and also broadcasts the neighboring cell frequency information so that the redistributed terminal may camp on a neighboring cell. The redistribution percentage and the frequency information of the neighboring cells may be broadcast in system information (e.g., SIB 3 or SIB 5). In so doing, an idle terminal of which dedicated signaling information related to the cell reselection is valid may be excluded from the redistribution.

As described above, if determining the cell over-load, the base station 110 broadcasts the redistribution information to the terminals. The idle terminals receiving the broadcast information determine whether to perform the redistribution to different frequencies/cells, and determine a target frequency/cell to camp on.

Figure 6:
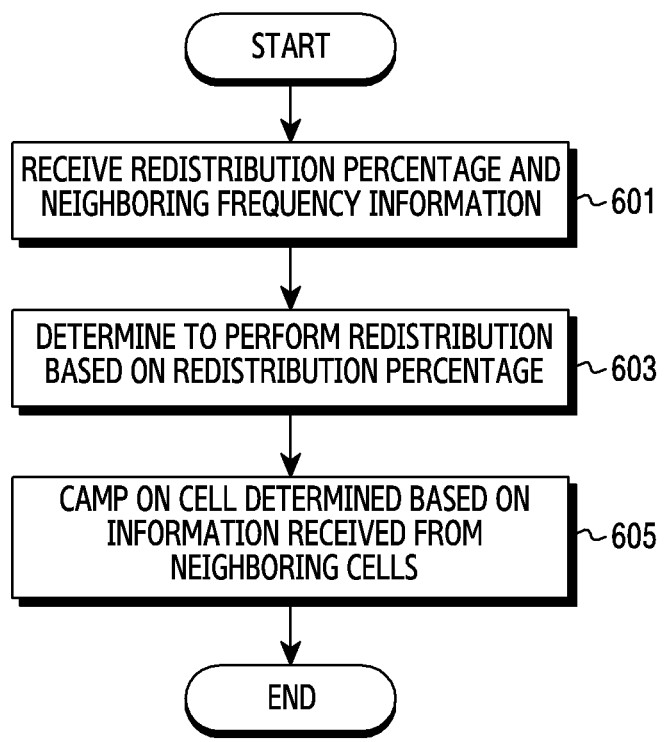
FIG. 6 illustrates an operating method of a terminal for performing a redistribution operation in a wireless communication system according to various embodiments of the present disclosure.
Figure 7:
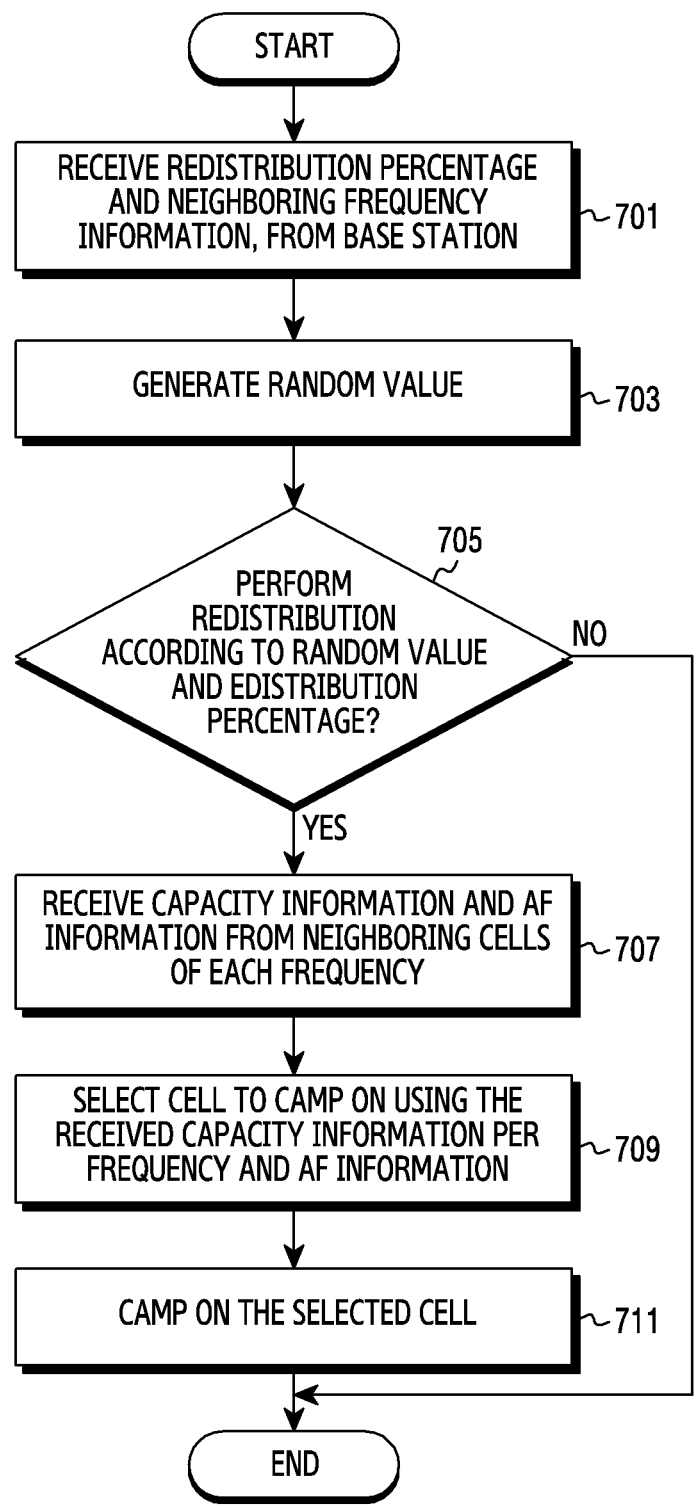
FIG. 7 illustrates a specific operating method of a terminal for performing a redistribution operation in a wireless communication system according to various embodiments of the present disclosure.

According to various embodiments of the present disclosure, a procedure of the terminal receiving the redistribution operation execution and the redistribution percentage from the camping base station for determining the redistribution operation may be performed as shown in FIG. 6 through FIG. 7.

FIG. 6 illustrates an operating method of a terminal for performing a redistribution operation in a wireless communication system according to various embodiments of the present disclosure. FIG. 6 illustrates an operating method of the terminal 140. The terminal 140 may be an idle terminal which is camping on the base station 110.

Referring to FIG. 6, in step 601, the terminal receives a redistribution percentage and frequency information of neighboring cells from a base station (e.g., the base station 110). That is, an idle terminal which camps on the base station receives idle terminal percentage information needing the redistribution as determined by the corresponding base station and the frequency information of the neighboring cells. For example, the terminal camping on the base station receives the idle terminal percentage needing the redistribution as determined by the base station which is in a cell over-loaded state and the information of the neighboring cells.

Next, in step 603, the terminal determines whether to perform a redistribution operation based on the received redistribution percentage. For example, the terminal determines a random value, compares the random value with a threshold corresponding to the received idle terminal percentage needing the redistribution, and then determines whether to perform the redistribution operation based on a comparison result. Hence, if the random value is generated in a uniform distribution, terminals corresponding to the percentage determined by the base station may determine to perform the redistribution operation. At this time, if the random value generated by the terminal has a value smaller than or equal to the threshold corresponding to the received redistribution percentage, the terminal may determine to perform the redistribution operation. According to other embodiments, if the random value generated by the terminal is greater than the threshold corresponding to the received redistribution percentage, the terminal may determine to communicate in the corresponding base station without performing the redistribution operation.

In step 605, the terminal camps on a cell which is determined based on information received from neighboring cells of each frequency. For example, the terminal may receive information broadcast from the neighboring cells. In so doing, the neighboring cells may be a multicarrier environment which operates at different frequencies, and the information broadcast from the neighboring cells of each frequency may include resource capacity status information and access factor information. The terminal may probabilistically select the frequency of the neighboring cell to camp on based on the resource capacity status information and the access factor information received from the neighboring cells of each frequency. That is, the terminal may determine a probabilistic percentage value of probability of acceptance or admission per frequency based on the resource capacity status information and the access factor information received from the neighboring cells of each frequency. Next, the terminal may generate a random value again, and determine a frequency of the generated random value by comparing the generated random value with interval boundary values corresponding to the probabilistic percentage. The terminal may camp on a corresponding neighboring cell corresponding to the determined frequency.

FIG. 7 illustrates a specific operating method of a terminal for performing a redistribution operation in a wireless communication system according to various embodiments of the present disclosure. FIG. 7 illustrates an operating method of the terminal 140. The terminal 140 may be an idle terminal camping on the base station 110.

Referring to FIG. 7, in step 701, the terminal receives a redistribution percentage and frequency information of neighboring cells from a base station (e.g., the base station 110). That is, an idle terminal camping on the base station receives idle terminal percentage information needing the redistribution as determined by the corresponding base station and the frequency information of the neighboring cells. For example, referring to the aforementioned FIG. 5, the base station determines that the cell is over-loaded, determines the idle terminal percentage needing the redistribution, and thus broadcasts the idle terminal percentage needing the redistribution and the information of the neighboring cells. The idle terminal camping on the base station receives the broadcast information from the base station. In so doing, the information received at the terminal may in particular include information of whether to perform the redistribution operation, the idle terminal percentage needing the redistribution and the frequency information of the neighboring cells.

Next, in step 703, the terminal generates a random value. That is, the terminal receiving the redistribution operation execution and idle terminal percentage information needing the redistribution from the base station terminal generates a random value using a method for determining whether to perform the redistribution operation.

In step 705, the terminal determines whether to perform the redistribution operation according to the generated random value and the received redistribution percentage. For example, the terminal may compare the arbitrary random value generated in step 703 with the idle terminal percentage information needing the redistribution received from the base station. If the generated random value is less than the idle terminal percentage value needing the redistribution, the terminal may determine that the redistribution is required, and determine to perform the redistribution operation. By contrast, if the generated random value is greater than the idle terminal percentage value needing the redistribution, the terminal may determine not to redistribute and determine not to perform the redistribution operation. If determining to perform the redistribution operation, the terminal proceeds to step 707. By contrast, if determining not to perform the redistribution operation, the terminal finishes this procedure.

If the terminal determines to perform the redistribution operation, in step 707, the terminal receives resource capacity status information and access factor (AF) information from neighboring cells of each frequency. That is, using the frequency information of the neighboring cells received from the base station, the terminal receives the resource capacity status information and the AF information broadcast from the neighboring cells of each frequency. For example, if the terminal services in an LTE network, a system information (e.g., SIB 1) message broadcast from the neighboring cells of each frequency may include cell capacity class value (CCCV), capacity value (CV) information and the AF information. The CCCV and CV information indicate the resource capacity status information of each cell defined in the 3GPP, and the AF information may be a value calculated by considering the number of terminals capable of connecting to a macro cell, a pico cell, and a femto cell at the same time and the number of currently connected terminals.

Next, in step 709, the terminal selects a cell to camp on using the received resource capacity status information per frequency and the AF information. For example, the terminal may probabilistically select a neighboring cell to camp on based on the resource capacity status information such as CCCV, CV received in step 707 and the AF information. That is, the terminal may calculate a value indicating acceptability of the terminal by considering the resource capacity status information for each frequency (fm) and the AF based on <Equation 6>, and calculate a rate for the acceptability of each frequency according to the calculated value.

$$X_{fm} = CCCV \times CV \times AF, m=1, \ldots, n \qquad \text{Equation 6}$$

In <Equation 6>, X_fm becomes a factor considering the resource capacity status information per frequency and the AF, and CCCV and CV denote the resource capacity status information per frequency. AF is the value calculated by considering the number of the terminals capable of connecting to the macro cell, the pico cell, and the femto cell at the same time and the number of the currently connected terminal. According to an embodiment, AF may be set as a system parameter to a value of 0.0 through 1.0 according to a policy of the network operator. For example, AF may be set to a different value depending on the cell type (e.g., a macro cell, an outdoor pico cell, an indoor pico cells, etc.). That is, it may be set to the indoor pico (1.0), the outdoor pico (0.8), and the macro cell (0.5). As another example, AF may be set to a different value depending on the carrier. That is, it may be set to f1 (1.0), f2 (0.9), and f3 (0.8) according to a carrier frequency. As yet another example, AF may be set to a relatively lower with respect to a cell which is frequently over-loaded. The terminal calculates the factor reflecting the acceptability of the terminal per frequency by considering the resource capacity status information per frequency from m=1 to n based on <Equation 6>, and calculates a rate of the factor per frequency based on <Equation 7>.

$$X_{f1} : X_{f2} \ldots : X_{fn} \qquad \text{Equation 7}$$

In <Equation 7>, each X_fm is the factor considering the resource capacity status information per frequency and the AF, and denotes the rate of the factor considering the resource capacity status information per frequency. If a plurality of cells corresponds to the frequency, the cell of the greatest X_fm value of the cells may be determined as the cell corresponding to the frequency.

According to one embodiment, <Equation 7> may be specifically calculated based on <Equation 8>. By taking a sum of the X_fm values calculated based on <Equation 6> as a denominator and taking the calculated X_fm values each as a numerator, the acceptability rate of the terminal per frequency may be calculated based on <Equation 8>.

$$\frac{X\_f1}{S} \times 100 : \frac{X\_f2}{S} \times 100 : \ldots : \frac{X_{fn}}{S} \times 100 \qquad \text{Equation 8}$$

In <Equation 8>, X_fm is the value calculated by considering the resource capacity status information per frequency and the AF, and S denotes a sum of the X_fm values up to m=1, ..., n.

Next, the terminal may generate a random value, and determine which interval the random value belongs to by comparing the generated random value with a boundary interval corresponding to each frequency factor rate of <Equation 8>. The terminal may determine a frequency corresponding to the interval to which the generated random value belongs, and select a cell corresponding to the determined frequency as a target cell to camp on.

Next, in step 711, the terminal camps on the selected cell. That is, the terminal performs a procedure for camping on the cell of the frequency selected in step 709.

As described above, for the cell over-load, the base station may determine the idle terminal percentage for the redistribution, and the terminal receiving such information may perform the redistribution operation through the process which determines whether to perform the redistribution operation and the neighboring cell to camp on.

Figure 8:
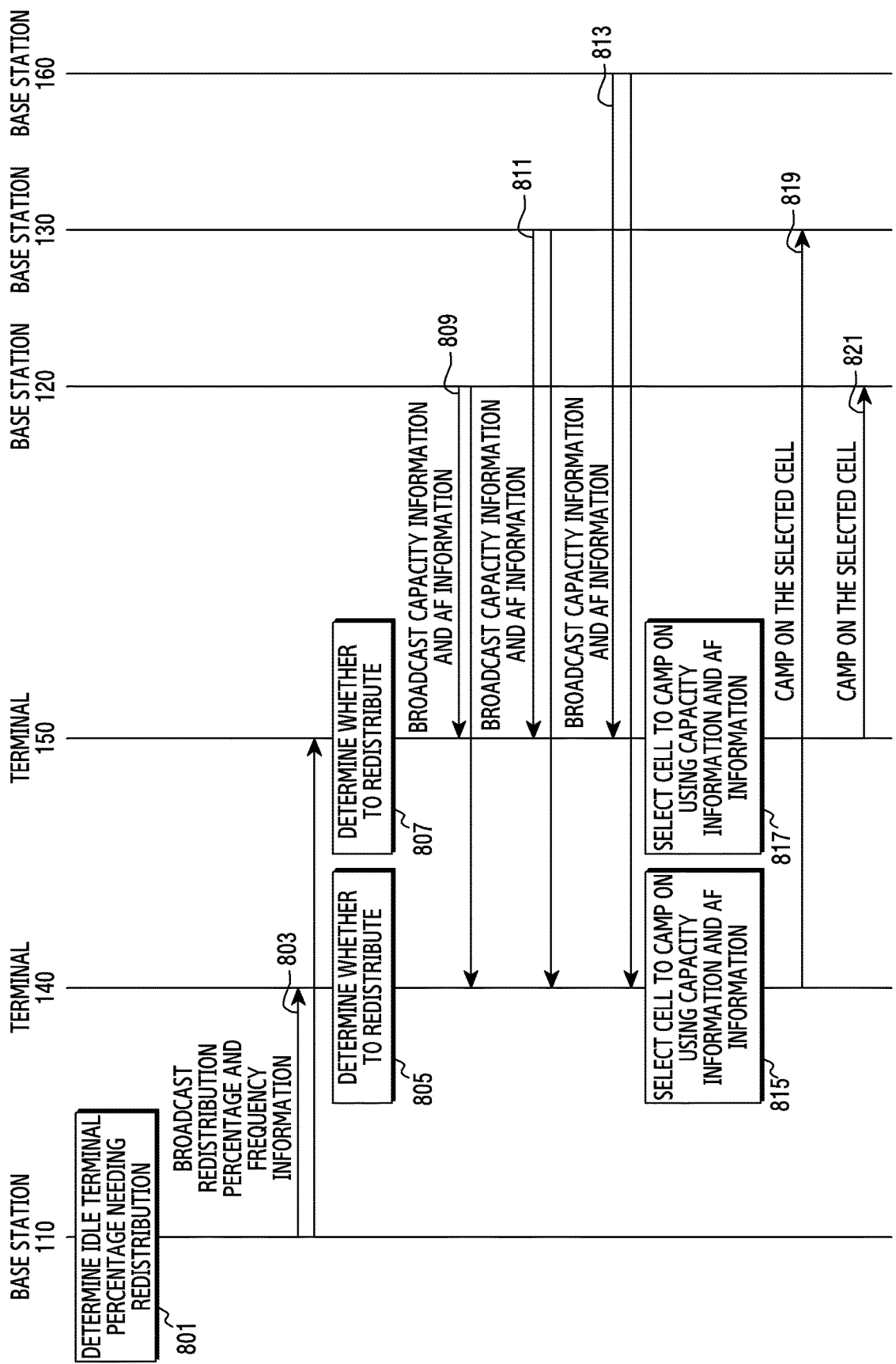
FIG. 8 illustrates signal flows between an over-loaded cell base station, a target base station and terminals in a wireless communication system according to various embodiments of the present disclosure.
Figure 9:
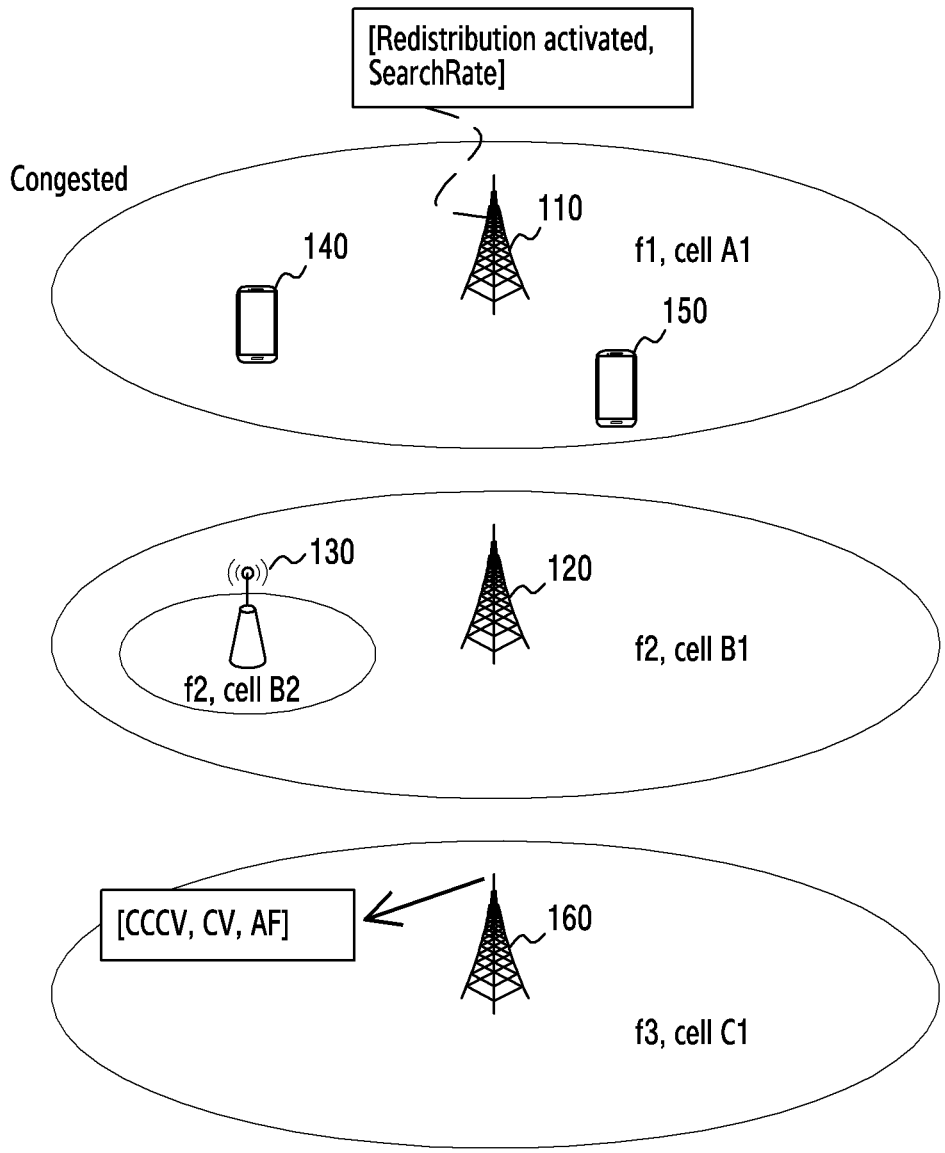
FIG. 9 illustrates an example of a redistribution operation execution situation of a terminal according to cell over-load in a wireless communication system according to various embodiments of the present disclosure.

According to various embodiments of the present disclosure, signals flows for the base station of the over-loaded cell to determine the redistribution percentage and for the terminal to determine to perform the redistribution operation according to the redistribution percentage information are shown in examples of FIG. 8 through FIG. 9.

FIG. 8 illustrates signal flows between an over-loaded cell base station, a target base station and terminals in a wireless communication system according to various embodiments of the present disclosure. That is, FIG. 8 illustrates the signal flows for determining and broadcasting an idle terminal percentage needing the redistribution in an over-loaded cell to terminals, determining at each terminal whether to perform a redistribution operation, and determining a target cell to camp on using resource capacity status information of a neighboring cell. Referring to FIG. 9, the base station 110, the base station 120, and the base station 160 of FIG. 8 operate at different frequencies (f1, f2, f3) as macro cells, and the terminal 140 and the terminal 150 operate by camping on the base station 110. The base station 130 represents a small cell base station which operates at the same frequency f2 as the base station 120. The terminal 140 and the terminal 150 may be idle terminals camping on the base station 110.

Referring to FIG. 8, in step 801, the base station determines an idle terminal percentage needing the redistribution. For example, the base station 110 may, if determining that is the cell is over-loaded, determine the idle terminal percentage needing the redistribution among the idle terminals camping on the base station. According to an embodiment, the idle terminal percentage needing the redistribution may be the redistFactor$_{serving}$ value calculated based on <Equation 5>.

Next, in step 803, the base station broadcasts the idle terminal percentage needing the redistribution and frequency information of neighboring cells. For example, the base station 110 may broadcast the idle terminal percentage needing the redistribution determined in step 801 and the frequency information of the neighboring cells to terminals in the over-loaded cell of the base station 110. Referring to FIG. 9, the terminal 140 and the terminal 150 located within the cell coverage of the base station 110 receive the idle terminal percentage needing the redistribution and the frequency information of the neighboring cells which are broadcast by the base station 110. In so doing, the frequency information of the neighboring cells may include list information of the macro cell base station 160 of the frequency f2, the small cell base station 130 of the frequency f2, and the macro cell base station 160 of and the frequency f3.

In step 805, the terminal determines whether to perform the redistribution operation. For example, the terminal 140 may determine whether to perform the redistribution operation based on the idle terminal percentage information needing the redistribution received from the base station 110. According to an embodiment, the terminal 140 determines whether to perform the redistribution operation by comparing the redistFactor$_{serving}$ value determined based on <Equation 5> and a random value generated by the terminal 140. If the generated random value is less than the redistFactor$_{serving}$ value received from the base station 110, the terminal 140 may determine to perform the redistribution operation. If the redistFactor$_{serving}$ value is received as 25 and the random value generated by the terminal 140 is 20, the terminal 150 may determine to perform the redistribution operation. If the terminal 140 determines to perform the redistribution operation, the terminal 140 goes to steps 809 through 813. According to other embodiments, if the generated random value is greater than the redistFactor$_{serving}$ value received from the base station 110, the terminal 140 may determine not to perform the redistribution operation. For example, if the redistFactor$_{serving}$ value is received as 25 and the random value generated by the terminal 140 is 41, the terminal 150 may determine not to perform the redistribution operation.

In step 807, another terminal determines whether to perform the redistribution operation. For example, the terminal 150 which is the another terminal in the coverage of the base station 110 may determine whether to perform the redistribution operation based on the idle terminal percentage information needing the redistribution received from the base station 110. According to an embodiment, the terminal 150 determines whether to perform the redistribution operation by comparing the redistFactor$_{serving}$ value determined by the base station 110 based on <Equation 5> and a random value generated by the terminal 150. If the generated random value is less than the redistFactor$_{serving}$ value received from the base station 110, the terminal 150 may determine to perform the redistribution operation. For example, if the redistFactor$_{serving}$ value is received as 35 and the random value generated by the terminal 150 is 30, the terminal 150 may determine to perform the redistribution operation. If the terminal 150 determines to perform the redistribution operation, the terminal 150 goes to steps 809 through 813. According to other embodiments, if the generated random value is greater than the redistFactor$_{serving}$ value received from the base station 110, the terminal 150 may determine not to perform the redistribution operation. For example, if the redistFactor$_{serving}$ value is received as 35 and the random value generated by the terminal 150 is 40, the terminal 150 may determine not to perform the redistribution operation.

In step 809, the base station broadcasts resource capacity status information and AF information. For example, the terminal 140 and the terminal 150 receive the resource capacity status information and the AF information of a corresponding base station frequency which are broadcast from the neighboring base station 120. According to an embodiment, the terminal 140 and the terminal 150 may receive a system information (e.g., SIB 1) message including the resource capacity status information including CCCV and CV and the AF information from the base station 120. The AF information may be a value calculated by considering the number of terminals capable of connecting to a macro cell, a pico cell, and a femto cell at the same time and the number of currently connected terminals. According to an embodiment, the AF information may have a value between 0 to 1 which is manually set by the network operator.

In step 811, the base station broadcasts resource capacity status information and AF information. For example, the terminal 140 and the terminal 150 receive the resource capacity status information and the AF information of a corresponding base station frequency which are broadcast from the base station 130. According to an embodiment, the terminal 140 and the terminal 150 may receive from the base station 130 a system information (e.g., SIB 1) message including the resource capacity status information including CCCV and CV and the AF information. The AF information may be the value calculated by considering the number of terminals capable of connecting to the macro cell, the pico cell, and the femto cell at the same time and the number of the currently connected terminals. According to an embodiment, the AF information may have the value between 0 to 1 which is manually set by the network operator.

In step 813, the base station broadcasts resource capacity status information and AF information. For example, the terminal 140 and the terminal 150 receive the resource capacity status information and the AF information of a corresponding base station frequency which are broadcast from the neighboring base station 160. According to an embodiment, the terminal 140 and the terminal 150 may receive from the base station 160 a system information (e.g., SIB 1) message including the resource capacity status information including CCCV and CV and the AF information. The AF information may be the value calculated by considering the number of terminals capable of connecting to the macro cell, the pico cell, and the femto cell at the same time and the number of currently connected terminals. According to an embodiment, the AF information may have the value between 0 to 1 which is manually set by the network operator.

Next, in step 815, the terminal selects a cell to camp on using the resource capacity status information and the AF information. That is, the terminal selects the target cell to camp on using the resource capacity status information of each frequency and the AF information which are broadcast from the neighboring base stations. For example, the terminal 140 may calculate a factor corresponding to acceptability of the terminal of each frequency based on <Equation 6> using the CCCV, CV, and AF values received from the neighboring base stations 120, 130, and 160. Referring to FIG. 9, since the base station 120 and the base station 130 are serviced at the same frequency f2, the terminal 140 needs to first determine the factor for the frequency f2. At this time, since the factor for the base station 120 is calculated as X_f2&B1 corresponding to the frequency f2 and the cell B1 and the factor for the base station 130 is determined to X_f2&B2 corresponding to the frequency f2 and the cell B2, the terminal 140 may select the cell B2 which is the greater value among those values. The terminal 140 determines a target cell to camp on according to the ratio of the selected X_f2&B2 and the factor X_f3&C1 for the frequency f3 and the cell C1 of the base station 160. That is, the terminal 140 may generate a random value, select a frequency of the range to which the random value belongs by comparing with a boundary value of a relative ratio interval of X_f2&B2: X_f3&C1, and determine the cell corresponding to the frequency as the target cell to camp on. For example, if the relative ratio of X_f2&B2:X_f3&C1 is 60:40, if the random value is generated as 49, the terminal 140 may determine the cell B2 as the target cell.

In step 817, the terminal selects the cell to camp on using the resource capacity status information and the AF information. For example, the terminal 150 calculates the factor corresponding to each frequency based on <Equation 6> using the CCCV, CV, and AF values received from the neighboring base stations 120 and 160. Referring to FIG. 9, the terminal 150 determines the target cell to camp on according to the ratio of the factor X_f2&B1 for the frequency f2 and the cell B1 of the base station 120 and the factor X_f3&C1 for the frequency f3 and the cell C1 of the base station 160. That is, the terminal 150 may generate a random value, and determine the cell of the range to which the random value belongs in the ratio of X_f2&B1: X_f3&C1 as the target cell to camp on. For example, if the relative ratio of X_f2&B1:X_f3&C1 is 70:30, if the random value is generated as 60, the terminal 150 may determine the cell B1 as the target cell.

Next, in step 819, the terminal camps on the selected cell. For example, the terminal 140 may camp on the B2 selected as the target cell in step 815. The terminal 140 transmits a message for the camping procedure to the base station 130 for the cell B2.

In step 821, the terminal camps on the selected cell. For example, the terminal 150 may camp on the B1 selected as the target cell in step 817. The terminal 150 transmits a message for the camping procedure to the base station 120 for the cell B1.

If the terminals receive the resource capacity status information such as CCCV, CV and the AF from the neighboring cells of each frequency as mentioned above, real-time load information may be updated faster than the information sharing between the base stations via the X2, and there is no need to broadcast the load information of unnecessary neighboring cells.

As such, the operating methods of the base station and the terminal for the redistribution of the idle terminal present the load distribution scheme if the cell is over-loaded. The present disclosure suggests a method for prompting the camping to a low-loaded cell if the terminal is disconnected from the base station, as a method for preventing the over-load of the cell in advance.

According to various embodiments of the present disclosure, an operating method of the base station for prompting the camping to a low-loaded cell if the terminal is disconnected from the base station may be performed as shown in FIG. 10 through FIG. 13.

Figure 10:
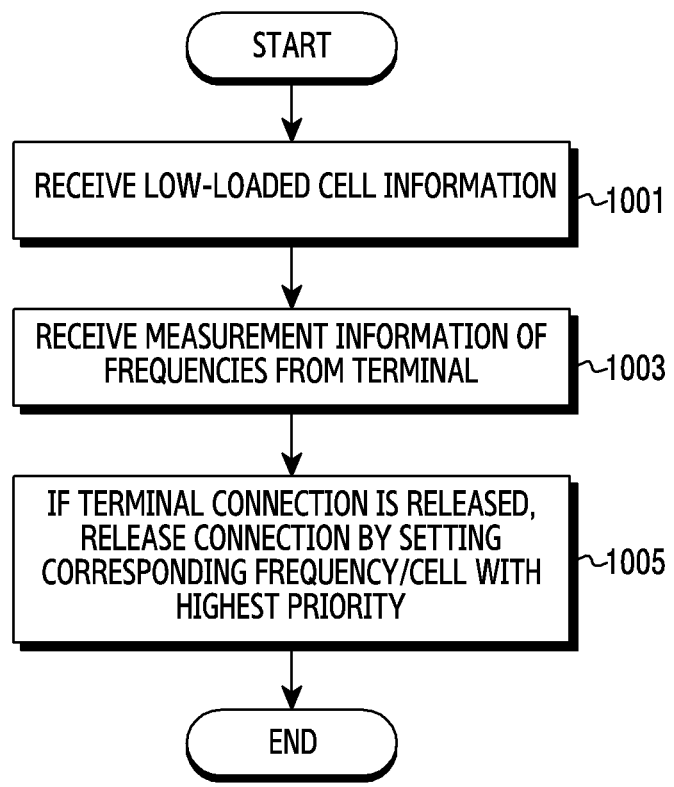
FIG. 10 illustrates an operating method of a base station for prompting camping to a low-loaded cell if a terminal is released with connection in a wireless communication system according to various embodiments of the present disclosure.

FIG. 10 illustrates an operating method of a base station for prompting camping to a low-loaded cell if a terminal is disconnected in a wireless communication system according to various embodiments of the present disclosure. For example, FIG. 10 illustrates an operating method of the base station 110.

Referring to FIG. 10, in step 1001, the base station receives low-loaded cell information from other base stations. That is, the base station 110 exchanges the low-loaded cell information with the neighboring base station (e.g., at least one of the base station 120, the base station 130 and the base station 160). According to an embodiment, the base station 110 may receive low-loaded frequency/cell information from the neighboring base station through a resource status reporting procedure periodically reported via the X2 protocol. According to another embodiment, the base station 110 may receive the low-loaded frequency/cell information from a low-loaded neighboring cell through a separate event-triggered message.

Next, in step 1003, the base station receives measurement information of frequencies including the low-loaded cell from the terminal. For example, the base station 110 may request the terminal to measure radio quality of nearby frequencies, and receive values measured by the corresponding terminal with respect to the frequencies including the low-loaded cell. The base station 110 may select terminals determined to be disconnected among terminals of coverage, direct to measure signal strength of a radio environment, and receive measured signal strength result values from corresponding terminals.

In step 1005, after receiving the measurement value, if performing the disconnection procedure with the corresponding terminal, the base station sets a corresponding frequency or cell with the highest priority. For example, if releasing the connection of the terminal which measures the frequency and transmits the result in step 1003, due to timer expiry, the base station 110 may set the corresponding frequency or cell with the highest priority in a connection release message to prompt the camping on the low-loaded cell. At this time, if the measurement report received from the terminal includes the low-loaded cell and the terminal is able to camp on the corresponding cell, the base station sets the corresponding frequency or cell with the highest priority. As a result, the released terminal is prompted to camp on the low-loaded cell and thus inter-cell load distribution may be achieved.

Figure 11:
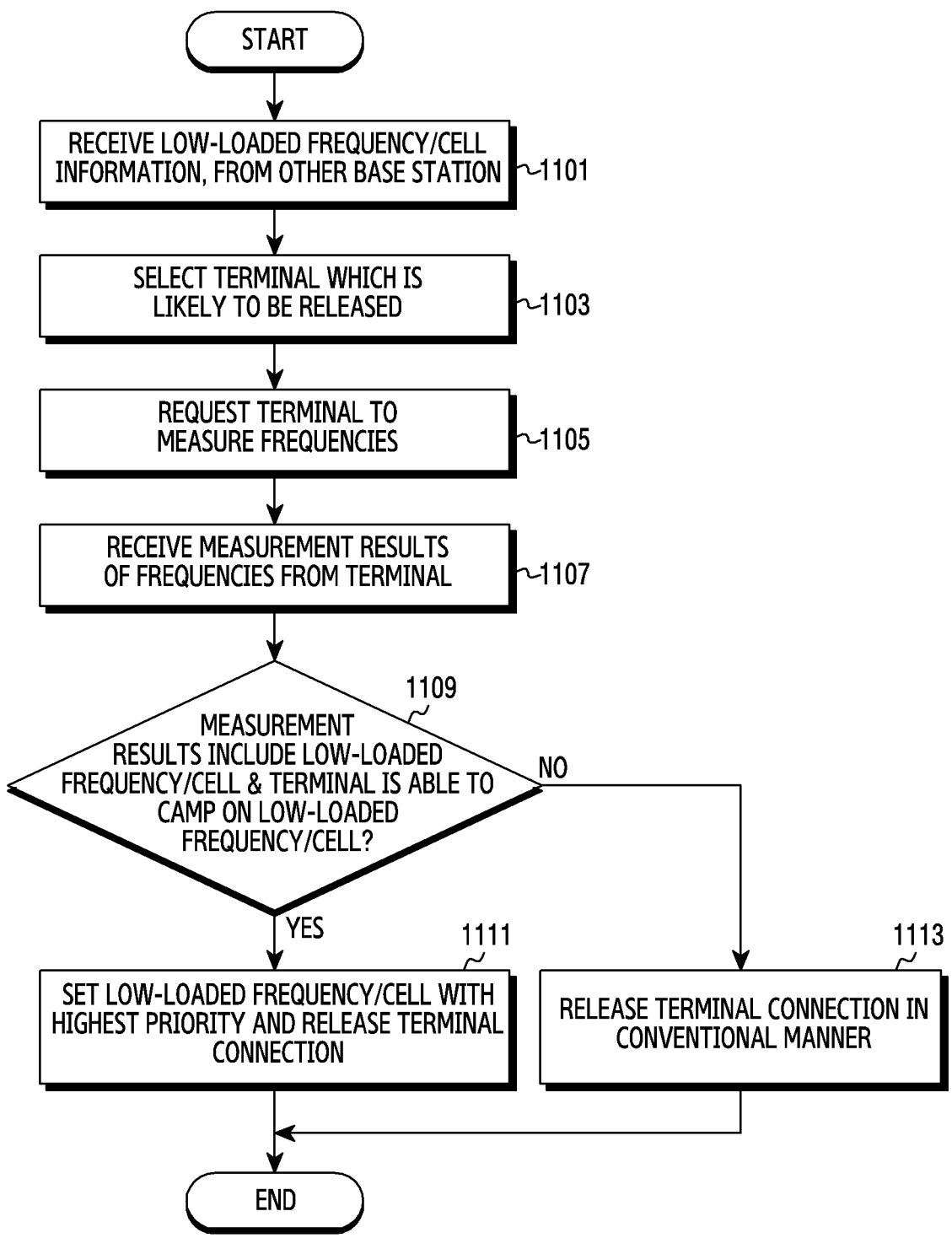
FIG. 11 illustrates a specific operating method of a base station for prompting camping to a low-loaded cell if a terminal is released with connection in a wireless communication system according to various embodiments of the present disclosure.

FIG. 11 illustrates a specific operating method of a base station for prompting camping on a low-loaded cell if a terminal is disconnected in a wireless communication system according to various embodiments of the present disclosure. FIG. 11 illustrates an operating method of the base station 110.

Referring to FIG. 11, in step 1101, the base station receives low-loaded frequency/cell information from other base station. That is, the base station 110 receives the low-loaded cell information from a neighboring base station (e.g., at least one of the base station 120, the base station 130 and the base station 160). According to an embodiment, the base station 110 may receive low-loaded frequency/cell information from the neighboring base station through a resource status reporting procedure periodically reported via the X2 protocol. According to another embodiment, the base station 110 may receive the low-loaded frequency/cell information from a low-loaded neighboring cell through a separate event-triggered message. As receiving the low-loaded frequency/cell information, the base station 110 may also receive validity timer information of corresponding information. The validity timer information is time information for considering the corresponding information effectively, and the base station 110 may use the received low-loaded frequency/cell information only during the validity timer time.

If the base station 110 receiving the low-loaded cell information from the neighboring base station is low-loaded, the base station 110 may not perform a separate operation for steps after step 1103 to be described. Instead, the base station 110 of the low-loaded state may transmit corresponding information to a neighboring cell through a separate event-triggered message. In so doing, the base station which transmits the low-load information may also transmit the validity timer information of the corresponding information. If the base station 110 receiving the low-loaded cell information from the neighboring base station is not low-loaded, the base station 110 may execute steps after step 1103.

Next, in step 1103, the base station selects a terminal which is likely to be released. For example, the base station 110 may determine terminals of which an inactivity timer passes a specific time as the terminals to be released. If no traffic flows between the terminal and the base station, the inactivity timer operates for the corresponding terminal, and if the timer expires, the corresponding terminal is released. Thus, the base station 110 may select the terminals of which the inactivity timer operates over the specific time among terminals (e.g., the terminal 140 and the terminal 150) in coverage to perform signal strength measurement of the radio environment before the connection release.

In step 1105, the base station requests the terminal to measure frequencies. That is, the base station requests the terminal selected in step 1103 to measure the radio environment with respect to nearby frequencies/cells. For example, the base station 110 may request the selected terminal to measure the signal strength of the nearby frequencies/cells before its inactivity timer expires and the connection release is conducted, and thus prompt to camp on the low-loaded frequency/cell before the connection release of the terminal. In so doing, the signal strength measurement request for the terminal may not affect the operation of the inactivity timer of the terminal.

Next, in step 1107, the base station receives measurement results of the frequencies from the terminal. That is, the base station receives the radio environment measurement results of the nearby frequencies/cells from the terminal requested to measure. For example, the base station 110 may receive the signal strength measurement results of the nearby frequencies/cells from the terminal requested to measure in step 1105.

Next, in step 1109, the base station determines whether the measurement results received from the terminal include a low-loaded frequency/cell, and whether the terminal is able to camp on the corresponding low-loaded frequency/cell. For example, the base station 110 differently performs the connection release operation of the terminal by determining whether the measurement report message received from the terminal include the low-loaded frequency/cell, and whether the terminal is able to camp on the corresponding low-loaded frequency/cell. If the measurement report message received from the terminal include the low-loaded frequency/cell and the terminal is able to camp on the corresponding low-loaded frequency/cell, the base station 110 proceeds to step 1111. If the measurement report message received from the terminal does not include the low-loaded frequency/cell, or if the terminal is not able to camp on the corresponding low-loaded frequency/cell, the base station 110 proceeds to step 1113.

If the received measurement results include the low-loaded frequency/cell and the terminal is able to camp on the corresponding low-loaded frequency/cell, in step 1111, the base station sets the corresponding frequency/cell with the highest priority in a connection release message, and notifies setting information to the terminal. For example, if the inactivity timer of the terminal expires and the connection is released, the base station 110 transmits to the terminal the connection release message in which the corresponding low-loaded frequency/cell is set with the highest priority.

If there is a plurality of low-loaded frequencies/cells, the base station needs to select a frequency/cell to set with the highest priority. According to an embodiment, if the base station 110 receives the low-loaded frequency/cell information from a neighbor base station using a resource status reporting procedure of the X2 protocol, the base station 110 may select a lower-loaded frequency/cell from the plurality of the low-loaded frequencies/cells. According to another embodiment, if the base station 110 exchanges low-loaded frequency/cell information with a neighboring base station using an event-triggered message, the base station 110 may select a frequency/cell of which the validity timer is left longer.

If the received measurement results do not include the low-loaded frequency/cell, or if the terminal is not able to camp on the corresponding low-loaded frequency/cell, in step 1113, the base station releases the connection of the terminal in a conventional manner. For example, if the inactivity timer of the terminal expires and the connection is released, the base station 110 releases the terminal connection according to the conventional method. If using the idle terminal distribution function in the conventional manner, the base station 110 may prompt the released terminal to camp on the corresponding frequency by setting the highest-priority frequency according to a frequency setting rate.

As stated above, if the terminal is released, the base station may perform the connection release of the terminal by setting the highest priority to prompt the camping on the low-loaded frequency/cell.

Figure 12:
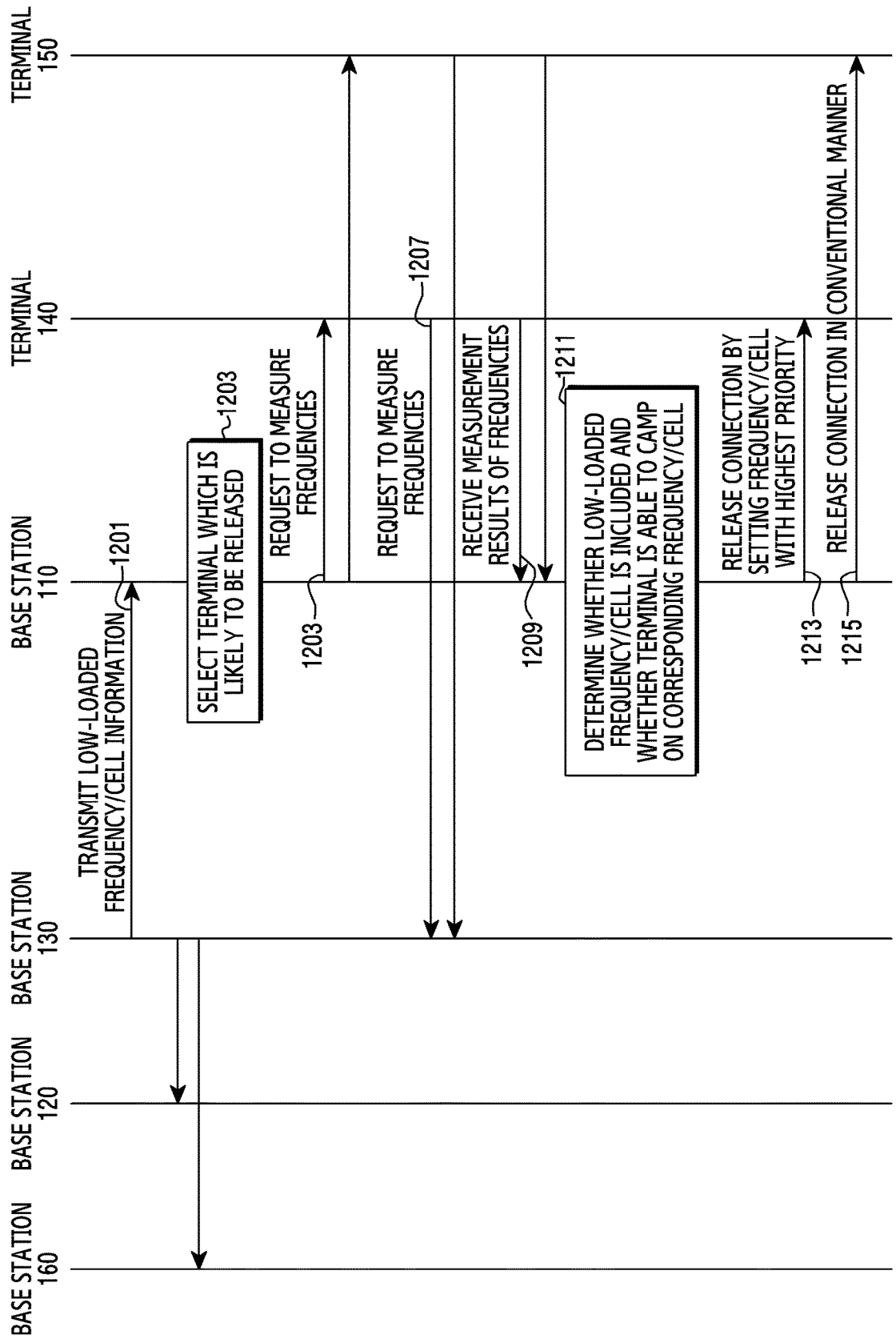
FIG. 12 illustrates signal flows between a base station, neighboring base stations and a terminal for load distribution to a low-loaded base station in a wireless communication system according to various embodiments of the present disclosure.
Figure 13:
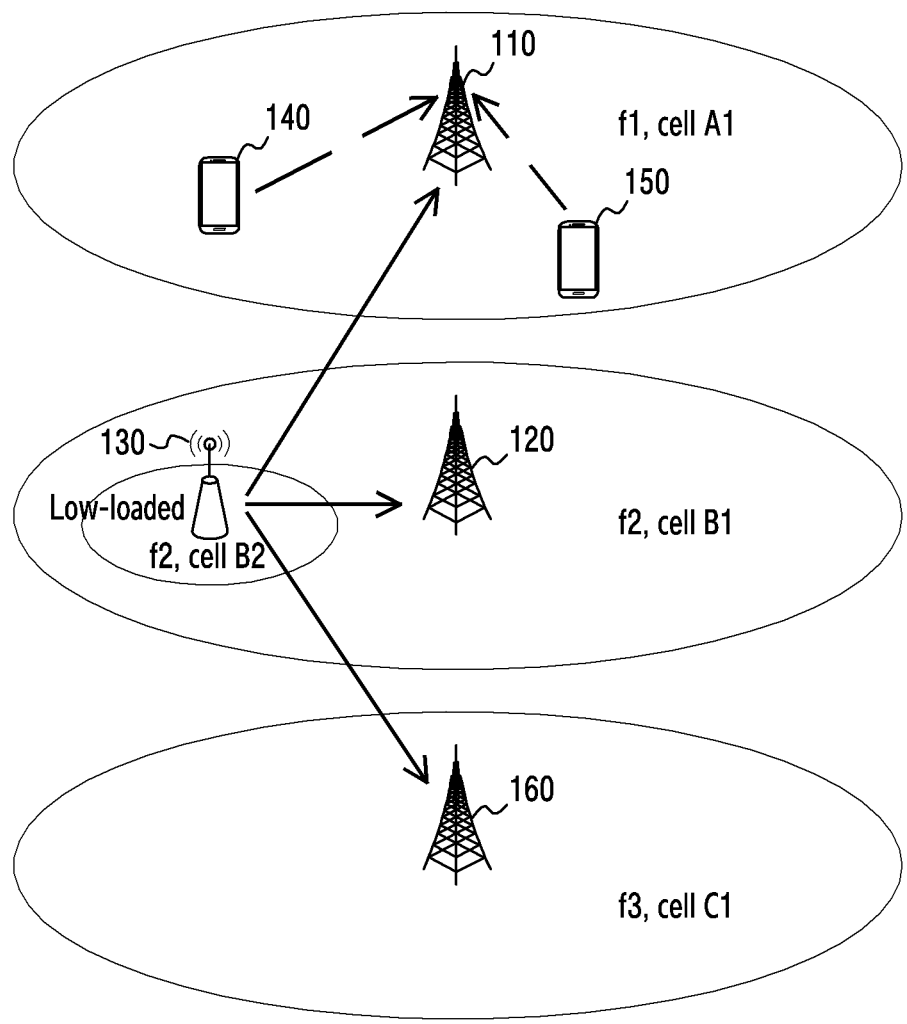
FIG. 13 illustrates an example of a situation for prompting camping of a terminal to a low-loaded cell in a wireless communication system according to various embodiments of the present disclosure.

According to various embodiments of the present disclosure, signal flows for the base station to determine the frequency/cell of the highest priority if the terminal is released may be illustrated as shown in examples of FIG. 12 through FIG. 13.

FIG. 12 illustrates signal flows between a base station, neighboring base stations and terminals for load distribution to a low-loaded base station in a wireless communication system according to various embodiments of the present disclosure. That is, FIG. 12 illustrates the signal flows for exchanging low-loaded frequency/cell information between base stations, receiving a radio environment measurement result from a terminal which is likely to be released, and thus setting the low-loaded frequency/cell with the highest priority if terminal connection is released. Referring to FIG. 13, the base station 110, the base station 120, and the base station 160 of FIG. 12 operate at different frequencies (f1, f2, f3) as macro cells, and the terminal 140 and the terminal 150 operate by camping on the base station 110. The base station 130 represents a small-cell base station operating at the same frequency f2 as the base station 120. The terminal 140 and the terminal 150 may be idle terminals camping on the base station 110.

Referring to FIG. 12, in step 1201, the base station transmits low-loaded frequency/cell information to other base station. For example, referring to FIG. 13, if determining the low-loaded state, the base station 110 transmits information informing that a frequency f2 and a cell B2 are the low-loaded frequency/cell to the neighboring base stations 110, 120 and 160. According to an embodiment, the base station 130 may transmit low-loaded frequency/cell information to the neighboring base stations through a resource status reporting procedure periodically reported via the X2 protocol. According to another embodiment, in the low-loaded state, the base station 130 may transmit the low-loaded frequency/cell information through a separate event-triggered message. As transmitting the low-loaded frequency/cell information, the base station 130 may also transmit validity timer information of corresponding information. The validity timer information is time information for considering the corresponding information effectively, and the base station 110 receiving it may use the received low-loaded frequency/cell information only during the validity timer time. According to an embodiment, the base station 110 receiving the low-loaded cell information from the neighboring base station may perform steps after step 1203 to be described, only if the base station 110 is not low-loaded.

Next, in step 1203, the base station selects a terminal which is likely to be released. For example, the base station 110 may determine the terminal 140 and the terminal 140 of which an inactivity timer passes a specific time as the terminals to be released. If no traffic flows between the terminal and the base station, the inactivity timer operates for the corresponding terminal, and if the timer expires, the terminal is released in connection. Thus, the base station 110 may determine the terminal 140 and the terminal 140 in coverage as the terminals of which the inactivity timer operates over the specific time, and select them to perform signal strength measurement of the radio environment before the connection release.

In step 1205, the base station requests the terminals to measure frequencies. That is, the base station 110 requests the terminal selected in step 1203 to measure the radio environment with respect to nearby frequencies/cells. For example, the base station 110 may request the selected terminal 140 and terminal 150 to measure the signal strength of the nearby frequencies/cells before including the low-loaded frequency f2/cell B2, and prompt to camp on the low-loaded frequency f2/cell B2 before the inactivity timer expires and the connection of the terminals is released. In so doing, the signal strength measurement request for the terminal 140 and the terminal 150 may not affect the operation of the inactivity timer of the terminal 140 and the terminal 150.

In step 1207, the terminals perform the measurement on the frequencies. For example, the terminal 140 and the terminal 150 requested by the base station 110 to measure perform the radio environment measurement on the nearby frequencies/cells. The terminal 140 and the terminal 150 may measure signal strength of frequency f2/cell B1 and frequency f3/cell C1, including the low-loaded frequency f2/cell B2.

In step 1209, the base station receives measurement results of the frequencies from the terminals. That is, the base station receives the radio environment measurement results of the nearby frequencies/cells from the terminal requested to measure. For example, the base station 110 may receive the signal strength measurement results of the nearby frequencies/cells including the low-loaded frequency f2/cell B2 from the terminal 140 and the terminal 150 requested to measure in step 1205.

Next, in step 1211, the base station determines whether the measurement results received from the terminal include a low-loaded frequency/cell and whether the terminal is able to camp on the corresponding low-loaded frequency/cell. For example, the base station 110 may differently perform the connection release operation of the terminal 140 and the terminal 150 by determining whether measurement report messages received from the terminal 140 and the terminal 150 include the low-loaded frequency/cell, and whether the terminal is able to camp on the corresponding low-loaded frequency/cell. Referring to FIG. 13, the base station 110 may determine that the measurement report message received from the terminal 140 includes the low-loaded frequency f2/cell B2 and the terminal 140 is able to camp on the corresponding low-loaded frequency f2/cell B2, and then the base station 110 may perform an operation for prompting the terminal 140 to camp on the low-loaded frequency f2/cell B2. By contrast, the base station 110 may determine that the measurement report message received from the terminal 150 includes the low-loaded frequency f2/cell B2 but the terminal 150 is not able to camp on the corresponding low-loaded frequency f2/cell B2, and then the base station 110 may perform the conventional connection release operation on the terminal 150.

In operation 1213, the base station releases the connection of the terminal by setting the low-loaded frequency/cell with the highest priority. For example, if the inactivity timer of the terminal 140 expires and the connection is released, the base station 110 may set the low-loaded frequency f2/cell B2 with the highest priority, and thus notify setting information to the terminal 140 and release the connection.

If there is a plurality of low-loaded frequencies/cells, the base station needs to select a frequency/cell to set with the highest priority. According to an embodiment, if the base station 110 receives the low-loaded frequency/cell information from the base station 130 and the neighbor base station using a resource status reporting procedure of the X2 protocol, the base station 110 may select a lower-loaded frequency/cell from the plurality of the low-loaded frequencies/cells. According to another embodiment, if the base station 110 exchanges low-loaded frequency/cell information with the base station 130 and the neighboring base station using an event-triggered message, the base station 110 may select a frequency/cell of which the validity timer is left longer.

In step 1215, the base station releases the connection of the terminal in a conventional manner. For example, if the inactivity timer of the terminal 150 expires and the connection is released, the base station 110 may release the connection of the terminal 150 according to the conventional method. If using the idle terminal distribution function in the conventional manner, the base station 110 may prompt the released terminal 150 to camp on the corresponding frequency by setting the highest-priority frequency according to a frequency setting rate.

The methods according to the embodiments described in the claims or the specification of the present disclosure may be implemented in hardware, software, or a combination of hardware and software.

For the software implementation, a computer-readable storage medium which stores one or more programs (software modules) may be provided. One or more programs stored in the computer-readable storage medium may be configured for execution by one or more processors of an electronic device. One or more programs may include instructions for enabling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable ROM (EEPROM), a magnetic disc storage device, a compact disc (CD)-ROM, digital versatile discs (DVDs) or other optical storage devices, and a magnetic cassette. Alternatively, the programs may be stored to a memory combining part or all of them. Also, a plurality of memories may be included.

Also, the programs may be stored in an attachable storage device accessible via a communication network such as Internet, Intranet, local area network (LAN), wide LAN (WLAN), or storage area network (SAN), or a communication network by combining these networks. Such a storage device may access an apparatus which realizes an embodiment of the present disclosure through an external port. Also, a separate storage device on the communication network may access the apparatus which realizes an embodiment of the present disclosure.

In the specific embodiments of the present disclosure as described above, the elements included in the disclosure are expressed in a singular or plural form. However, the singular or plural expression is appropriately selected according to a proposed situation for the convenience of explanations, the present disclosure is not limited to a single element or a plurality of elements, the elements expressed in the plural form may be configured as a single element, and the elements expressed in the singular form may be configured as a plurality of elements.

Meanwhile, the detailed description of the present disclosure has been described with reference to certain embodiments thereof, but various modifications may be made without departing from the scope of this disclosure. Therefore, the scope of this disclosure should not be limited to the described embodiments but should be defined by the claims as below and their equivalents within the scope of the claims.

The invention claimed is:

1. A method performed by a base station in a wireless communication system, the method comprising:
broadcasting information on resource capacity status of a cell and access factor of the cell; and
determining to perform a camping procedure with a terminal on the cell, in case that the terminal to perform a redistribution operation is determined based on a percentage of idle mode terminals,
wherein the percentage of idle mode terminals is a percentage of a previous cell to move to other cell through the redistribution operation,
wherein the cell is identified among a plurality of cells based on a camping percentage determined by the resource capacity of the cell and the access factor, and
wherein the access factor is a value determined based on a number of connectable terminals to the cell and a number of connected terminals to the cell.

2. The method of claim 1, wherein the information on resource capacity status comprises a total radio resource amount and an available radio resource amount based on a load metric calculation value of the cell.

3. The method of claim 2, wherein the load metric of the cell is calculated using at least one of a radio resource amount being used, a target data rate per service, an average radio resource usage per bit, and or an effective transmit bearers per time.

4. A method performed by a terminal in a wireless communication system, the method comprising:
receiving a percentage of idle mode terminals;
in case that determining to perform a redistribution operation of the terminal based on the percentage of the idle mode terminals, receiving information on resource capacity and access factor from neighboring cells; and
determining a cell to camp on based on of the information on the resource capacity and the access factor.

5. The method of claim 4, wherein the determining of the cell to camp on comprises:
generating a random value; and
determining the cell for the terminal to camp on by comparing the generated random value with a camping percentage.

6. The method of claim 4, wherein the access factor comprises a value determined based on a number of terminals connectable at the same time and a number of terminals currently connected according to whether the neighboring cells each are a macro cell, a pico cell, or a femto cell.

7. A method performed by a base station in a wireless communication system, the method comprising:
receiving information of a low-loaded cell from a neighboring base station;
receiving measurement results of signal strength of neighboring cells from a terminal;
identifying the low-loaded cell from the received measurement results of the signal strength of the neighboring cells;
in case that connection of the terminal is released, setting the identified low-loaded cell with the highest priority, based on the received information of the low-loaded cell and the received measurement results; and
transmitting information of the setting to the terminal.

8. The method of claim 7, wherein the receiving of the information of the low-loaded cell from the neighboring base station comprises:
receiving the information of the low-loaded cell from the neighboring base station using a resource status reporting procedure with a X2 protocol.

9. The method of claim 7, wherein the receiving of the information of the low-loaded cell from the neighboring base station comprises:
receiving validity timer information of the information of the low-loaded cell, together with the information of the low-loaded cell from the neighboring base station.

10. The method of claim 7, wherein, in case that a plurality of cells is low-loaded, setting of the identified low-loaded cell with the highest priority comprises:
setting a cell of a lowest load among the plurality of the identified low-loaded cells with the highest priority.

11. The method of claim 7, wherein the receiving of the measurement results of the signal strength of the neighboring cells from the terminal comprises:
determining a terminal of which an inactivity timer passes a predefined time among terminals connected to a cell of the base station;
transmitting a signal strength measurement request of signal strength for the neighboring cells to the determined terminal; and
receiving the signal strength measurement results of the signal strength of the neighboring cells from the determined terminal.

12. The method of claim 7, wherein the setting of the identified low-loaded cell with the highest priority comprises:
setting the identified low-loaded cell with the highest priority based on whether the measurement results of the signal strength of the neighboring cells received from the terminal comprise the identified low-loaded cell and whether the terminal is able to camp on the identified low-loaded cell.

13. The method of claim 7, wherein, in case that a plurality of cells is low-loaded, setting of the identified low-loaded cell with the highest priority comprises:

setting a cell having a validity timer that is left longest among the plurality of the identified low-loaded cells with the highest priority.

14. The method of claim 1, wherein the determining to perform a camping procedure comprises:

generating a random value; and determining the cell for the terminal to perform a camping procedure on by comparing the generated random value with the camping percentage.

15. The method of claim 1, wherein the access factor comprises a value determined based on a number of terminals connectable at the same time and a number of terminals currently connected according to whether a neighboring cells each are a macro cell, a pico cell, or a femto cell.

* * * * *